US008635236B2

(12) United States Patent
Lee et al.

(10) Patent No.: US 8,635,236 B2
(45) Date of Patent: Jan. 21, 2014

(54) AUGMENTED LIST FOR SEARCHING LARGE INDEXES

(75) Inventors: Bongshin Lee, Issaquah, WA (US); Bo Thiesson, Woodinville, WA (US); Tim Paek, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 861 days.

(21) Appl. No.: 12/342,063

(22) Filed: Dec. 22, 2008

(65) Prior Publication Data
US 2010/0162175 A1  Jun. 24, 2010

(51) Int. Cl.
*G06F 7/00* (2006.01)
*G06F 17/30* (2006.01)

(52) U.S. Cl.
USPC .......................................... 707/758

(58) Field of Classification Search
USPC .......................................... 715/860
See application file for complete search history.

(56) References Cited

U.S. PATENT DOCUMENTS

| | | | | |
|---|---|---|---|---|
| 5,982,876 | A * | 11/1999 | Albesa | 379/354 |
| 6,028,605 | A | 2/2000 | Conrad | |
| 6,502,090 | B1 * | 12/2002 | Raisanen | 707/721 |
| 6,697,483 | B1 * | 2/2004 | Saarinen et al. | 379/354 |
| 6,801,659 | B1 * | 10/2004 | O'Dell | 382/185 |
| 7,089,188 | B2 | 8/2006 | Logan | |
| 7,130,847 | B2 | 10/2006 | Waters | |
| 7,277,029 | B2 | 10/2007 | Thiesson | |
| 2005/0187976 | A1 * | 8/2005 | Goodman et al. | 707/104.1 |
| 2005/0246324 | A1 * | 11/2005 | Paalasmaa et al. | 707/3 |
| 2005/0256823 | A1 | 11/2005 | Seward | |
| 2006/0101503 | A1 * | 5/2006 | Venkataraman et al. | 725/136 |
| 2006/0242599 | A1 * | 10/2006 | Choo et al. | 715/821 |
| 2007/0061348 | A1 * | 3/2007 | Holland et al. | 707/100 |
| 2007/0255552 | A1 | 11/2007 | Thiesson | |
| 2007/0299842 | A1 * | 12/2007 | Morris et al. | 707/7 |
| 2008/0046396 | A1 * | 2/2008 | Gelhar | 707/1 |
| 2008/0168381 | A1 * | 7/2008 | Nelson et al. | 715/780 |
| 2009/0132385 | A1 * | 5/2009 | Inoue et al. | 705/26 |

OTHER PUBLICATIONS

Ahlberg, C., B. Shneiderman, The Alphaslider: A compact and rapid selector, Proc. Conf. on Human Factors in Computing Sys's, CHI 1994, Apr. 24-28, 1994, pp. 365-371, Boston, Massachusetts, USA.

(Continued)

*Primary Examiner* — Uyen Le

(57) ABSTRACT

An augmented large index searching system and method for searching a database of items using a device having a limited input mechanism. Embodiments of the system and method present to a user in an augmented list view or a regular list view a list of items matching a sub-string search. The augmented list view contains a list of sub-group representations so that each sub-group is represented by an item in the sub-group most likely to be selected by the user. The user can select an item wanted by the user or refine the sub-string search by pinning a character to append the character to the sub-string and generate a revised sub-string. The above process is repeated using the revised sub-string. The list can be augmented by displaying visual features that indicate quantity and distinguish between items or characters by using coloring, highlighting, shading, size, and so forth.

19 Claims, 19 Drawing Sheets

(56) References Cited

OTHER PUBLICATIONS

Chittaro, L., L. De Marco, Evaluating the effectiveness of "effective view navigation" for very long ordered lists on mobile devices, Proc. of the Int'l Conf. on Human-Computer Interaction, Interact 2005, Sep. 12-16, 2005, pp. 482-495, Rome, Italy, Springer.

Church, K. W., B. Thiesson, R. Ragno, K-Best suffix arrays, Proc. of the Human Language Tech. Conf. of the North American Chapter of the Assoc. of Computational Linguistics, HLT-NAACL (Short Papers) 2007, Apr. 22-27, 2007, pp. 17-20, Rochester, New York, USA.

Huot, S., E. Lecolinet, SpiraList: A compact visualization technique for one-handed interaction with large lists on mobile devices, Proc. of the 4th Nordic Conf. on Human-Computer Interaction, NordiCHI 2006, Oct. 14-18, 2006, pp. 445-448, Oslo, Norway.

Sanders, T., Microsoft plays mobile search 'wildcard', May 3, 2006, http://www.v3.co.uk/print_article/v3-uk/news/1963840/microsoft-plays-mobile-search-wild-card.

Zhou, X., Y. Xu, G. Chen, Z. Pan, A new wildcard search method for digital dictionary based on mobile platform, Workshop Proc. of the 16th Int'l Conf. on Artificial Reality and Telexistence, ICAT 2006, Nov. 29-Dec. 1, 2006, pp. 699-704, Hangzhou, China.

\* cited by examiner

AUGMENTED LIST FOR SEARCHING LARGE INDEXES

BACKGROUND

Portable media players are popular devices that play a variety of media. These players typically have a large database of media that is stored on the device. For example, a portable media player may contain a large music library with many song titles and artists. Depending on the extent of a user's music library, this large index (or list) of titles and names can number in the thousand to tens of thousands of items.

In order to reduce their size and retain portability, these players generally have a limited input mechanism with which a user can enter commands. A limited input mechanism generally means that the portable media player lacks a keyboard. Instead, these players have a small number of simple arrow keys that allow the user to input up, down, left, right, and accept commands. This simple type of limited input mechanism is also known as a directional pad (or d-pad). Other portable media players may have touch pads or touch screens that allow generally the same limited form of user input.

The combination of a large database and a limited input mechanism of portable media players often make it difficult for a user to find a desired item in the large database. This is especially true as the size of the user's database becomes increasingly larger. For example, as a user adds to her music library it may become increasingly more difficult to find a desired song or artist within that library using the limited input mechanism of the device.

In order to find a desired item, current portable media players generally use an infix matching technique. Infix matching techniques work by matching a sub-string (such as a partial song title or partial artist name) with character strings in the index of items. This matching of the sub-string occurs anywhere in the characters string. For example, if the sub-string to be matched contains the letters "ina," then infix matching may find a match in the index of both "tina turner" and "christina." Current portable media players also lack popularity matching, whereby the most popular items are matched before less popular items. For example, even though a particular user has a favorite song or artist it may require much input from the user on the limited input mechanism to obtain the desired favorite song or artist. This can be especially frustrating for the user when she desires a song or artist that is frequently played.

A user also may often use her portable media player to buy additional items from online sources to save in her player. For example, the user may want to buy additional songs to add to her music library from an online music store. In this situation, the number of items (such as song titles and music artists) contained in the index or database of the online store can easily number from several hundred thousand to millions. There are still other situations in which a user may want to buy items from a large index of items using a device having a limited input mechanism. For example, a user may want to buy an item (such as movies, cars, groceries, and so forth) from an online store using a cable television with input constrained by a limited input mechanism such as a television remote control. In these situations, the combination of a large database and limited input mechanism again make it difficult for a user to find a desired item in the large database.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the augmented large index searching system and method include an augmented list user interface that enables a user to quickly retrieve items from a large index using a device (such as portable media player) having a limited input mechanism. The user typically inputs commands using a limited input mechanism, such as a directional pad having only up, down, left, right, and accept inputs. The augmented large index searching system is designed to operate on a large database of items (such as several hundred of thousands or millions of items) and with a device where the user has limited input capability (without a keyboard).

In general, embodiments of the augmented large index searching system and method take the database of items, display at least some of the items to a user in list view based on a sub-string search, and determine whether the augmented list contains the item that is wanted by the user. If the item wanted by the user is found user can select the item. Otherwise, the user can refine the sub-string search by appending a character on the list to the current sub-string to generate a revised sub-string. The action of appending the character to the sub-string is called "pinning." Pinning narrows the search for the desired item. Embodiments of the augmented large index searching system and method then process the refined sub-string to generate an updated list. This updated list then is presented to the user. This is an iterative process that continues until the user finds the desired item or until it becomes apparent that the desired item is not in the database of items.

Embodiments of the augmented large index searching system include a list selection module that determines whether to use an augmented list view of items or a regular list view of items. The list selection module obtains a count of matches to the current sub-string from either a hash table or an information retrieval system. At least three types of sub-string matching techniques can be used, including prefix, prefix at word boundary, and infix matching. A determination is made as to whether the count of matches to the current sub-string is greater than a list threshold. If so, then an augmented list of items if generated. If not, then a regular list of items is generated.

Generation of the augmented list of items is performed by an augmented list generation module. This module generates an augmented list of items using the hash table and the information retrieval system. The matches are arranged in sub-groups based on available characters. For each sub-group, a determination is made as to whether the hash table contains an entry for a count of items for that sub-group using an expanded sub-string, where the expanded sub-string is the current sub-string plus a character representing the sub-group currently being processed. If the hash table contains the count of items for that sub-group then the augmented list generation module retrieves the count of items from the hash table. If not, then matches are looked up for the expanded sub-string and the count of the expanded sub-string matches is retrieved using the information retrieval system.

The augmented list generation module then determines an item in the sub-group that is most likely to be selected by the user based on scoring criteria. The information retrieval system 210 is used exclusively to find the item most likely to be selected by the user. Each sub-group entry is represented by the item in that particular sub-group that is most likely to be selected by the user if there are any items in that sub-group. Thus, the number of sub-groups represented will be less than or equal to the number of available characters.

Generation of the regular list of items is performed by a regular list generation module. The regular list generation module generates the regular list of items using the information retrieval system. The module inputs the sub-string and then retrieves each of the matches of the sub-string using the information retrieval system.

Embodiments of the augmented large index searching system also include a list augmentation module that takes the augmented list of items or the regular list of items and augments either list by adding visual representations to them. If the list view is an augmented list view, then the list augmentation module may display a quantity representation for each of the sub-groups that visually indicates the number of items in that sub-group. Visual augmentation may also be used that distinguish between items or characters by using coloring, highlighting, shading, size, and so forth.

A sub-string revision module is used to determine whether the sub-string being processed needs revision in view of contents of the augmented list of items or the regular list of items. If an item wanted by the user is on the list then the user selects the desired item. If the desired item is not on either list, then the module accepts user input from a limited input mechanism and revises the current sub-string being processed by appending a character to the sub-string. This character is a character on the augmented list view or the regular list view that has been pinned by the user.

Embodiments of the system and method also use a threshold-based combination of a hash table and an information retrieval system to provide efficient matching and determination of which item in a sub-group is most likely to be selected by a user (such as ordering items based on popularity). The information retrieval system is used to find the item most likely to be selected by the user for each sub-group in the augmented list view displayed to the user. The hash table is used to find the quantity of items in a sub-group for a sub-string as long as there are more sub-string matches than a threshold number (called a hash threshold) in that sub-group. When the number of sub-string matches falls below the threshold, then the information retrieval system is used to find the quantity of sub-string matches in the sub-group as well.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the augmented large index searching system and method reference is made to the accompanying drawings, which form a part thereof, and in which is shown by way of illustration a specific example whereby embodiments of the augmented large index searching system and method may be practiced. It is to be understood that other embodiments may be utilized and structural changes may be made without departing from the scope of the claimed subject matter.

I. System Overview

Figure 1:
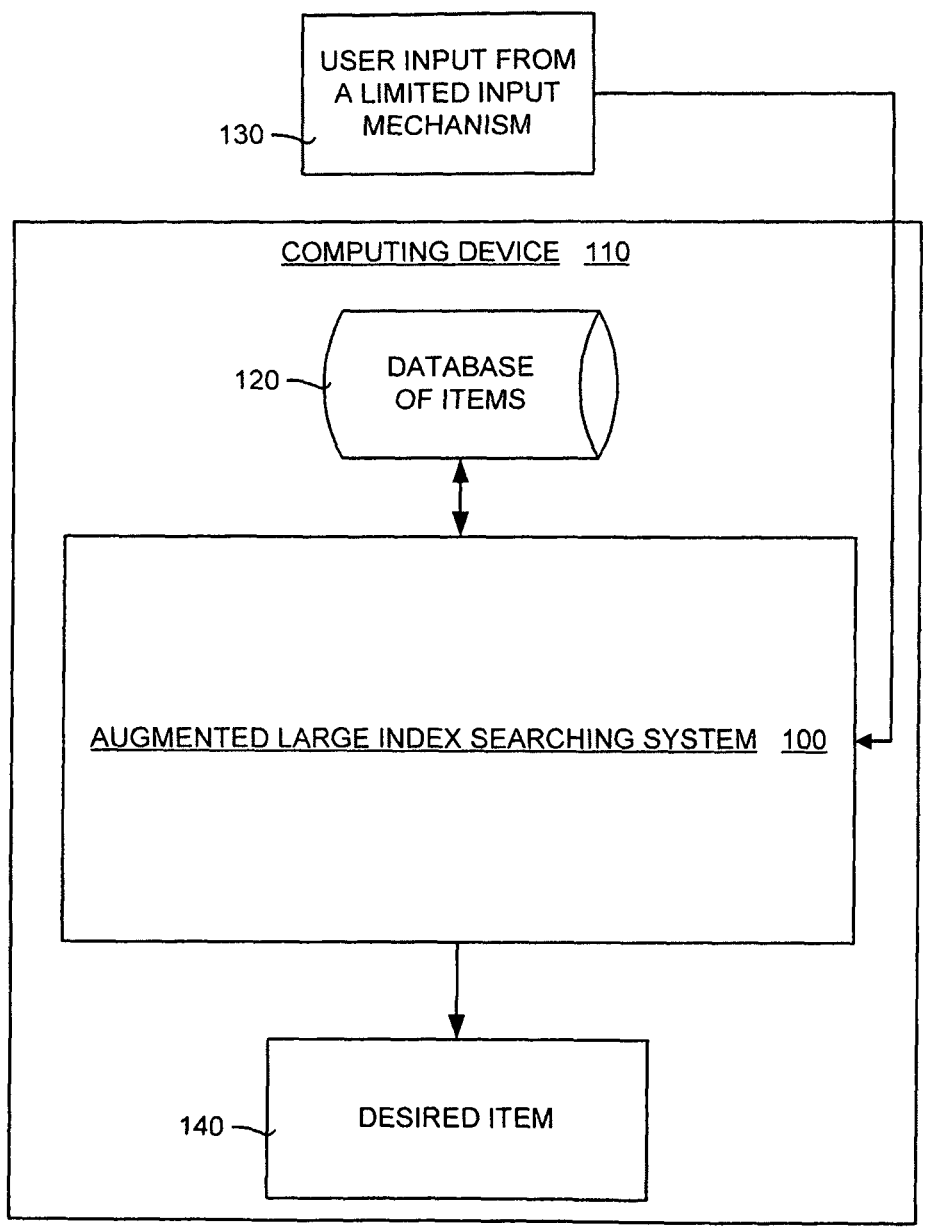
FIG. 1 is a block diagram illustrating a general overview of embodiments of the augmented large index searching system and method disclosed herein.

FIG. 1 is a block diagram illustrating a general overview of embodiments of the augmented large index searching system and method disclosed herein. It should be noted that the implementation shown in FIG. 1 is only one of many implementations that are possible. Referring to FIG. 1, an augmented large index searching system 100 is shown implemented on a general-purpose computing device 110. The input to the augmented large index searching system 100 is a database of items 120. The augmented large index searching system 100 receives input from a user that is giving the input using a limited input mechanism 130.

It should be noted that the general-purpose computing device 110 includes any type of processing device having a means of displaying output to a user of the device 110 and a means for the user to input data or commands. Typically, the general-purpose computing device 110 will have a limited input mechanism by which the user can offer input. As used in this document, "limited" input means without a standard QWERTY-type keyboard. Instead, a limited input mechanism has a directional pad (d-pad) for both menu navigation and general input, similar to a joystick. The d-pad may include up, down, left, and right keys, buttons, or sensors. Less limiting types of input mechanisms include a touchpad and a touchscreen. By way of example, the device 110 may be a mobile computing device, a portable media player, or a television system using a remote control including a d-pad or a game controller. Moreover, the general-purpose computing device 110 may have a single processor or may have several processors and devices connected to each other.

The database (or index) of items 120 typically is a large database having many items. By way of example, the database of items 120 may contain several hundreds of thousands or even millions of items. The items could be virtually any type of items that can be searched. For example, the items may be song titles or artists that are sold by an online music store, movie titles being sold by an online video store, game titles sold by an online game store, automobiles sold by an online dealer, or grocery or catalog items that are sold by an online store.

In general, the augmented large index searching system 100 inputs the database of items 120 and, based on initial sub-string, displays some ordered form of the database of items 120 to a user (not shown) in an augmented list. The user can either decide whether the item she is seeking (the desired item) is in the augmented list. If so, then the user can select the desired item. Otherwise, the user can revise the sub-string by pinning a character on the augmented list. The augmented list is revised based on the revised sub-string and once again presented to the user. This process continues until the desired item is found or it becomes apparent that the desired item is not in the database of items.

As noted above, the user typically is using a limited input mechanism, such as a d-pad having only up, down, left, right, and accept inputs. The augmented large index searching system 100 is designed to operate on a large database of items (such as several hundreds of thousands or millions of items) and with a device where the user has limited input capability (without a keyboard). The augmented large index searching system 100 processes the database of items 120 based on the user input 130 in order to quickly find an item desired by the user in from the large database of items 120. The output of the augmented large index searching system 100 is a desired item 140 that was desired by the user from the database of items 120.

II. Operational Overview

Figure 2:
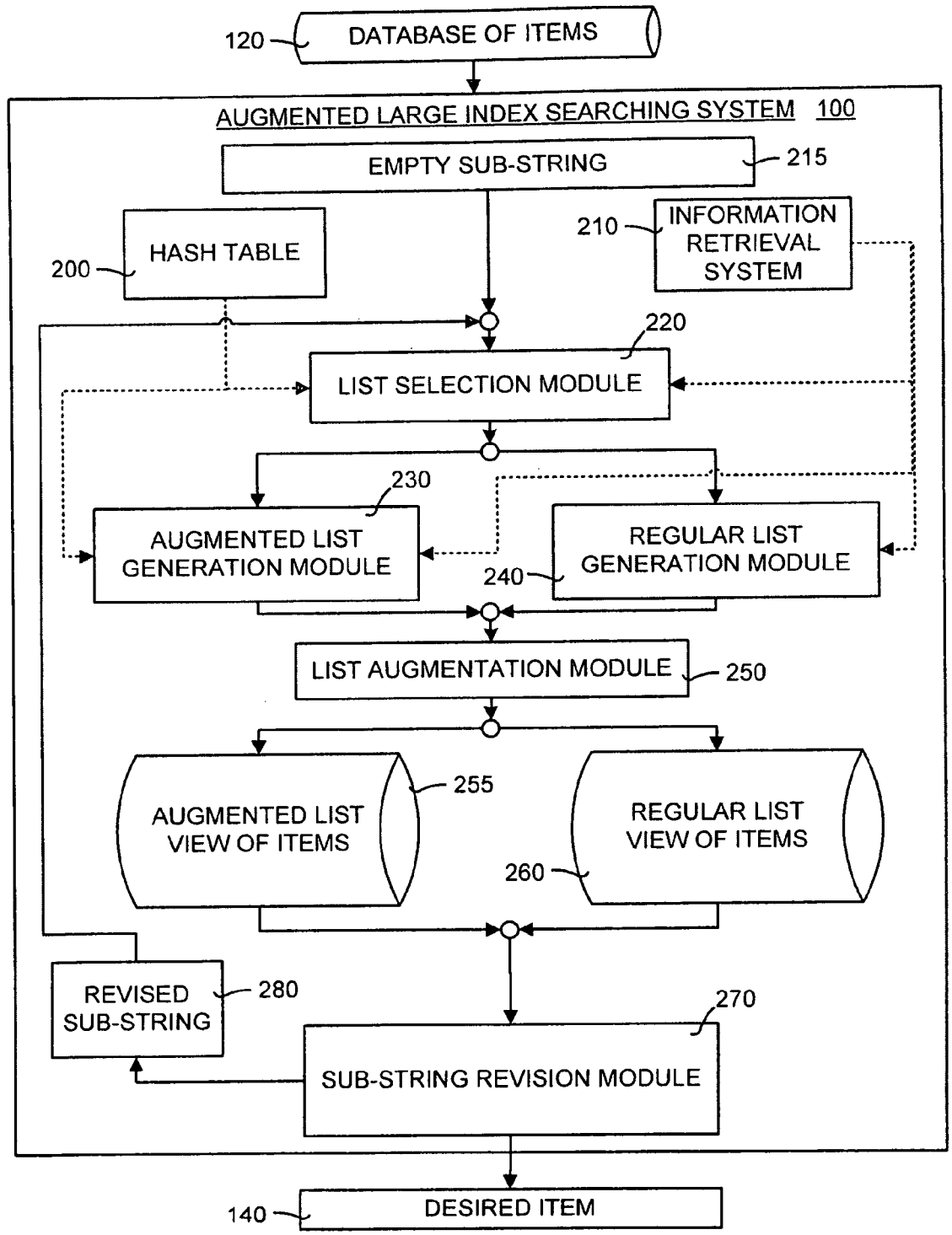
FIG. 2 is a block diagram illustrating an overview of embodiments of the augmented large index searching system and method shown in FIG. 1.

FIG. 2 is a block diagram illustrating an overview of embodiments of the augmented large index searching system 100 and method shown in FIG. 1. In general, the augmented large index searching system 100 and method find an item desired by a user in a large database of items when the user has a constrained or limited input capability (such as a d-pad but no keyboard). In these situations of a large database and a limited input capability, the augmented large index searching system 100 and method allow the user to quickly find a desired item from the database of items with a minimum of effort.

As shown in FIG. 2, the augmented large index searching system 100 inputs the database of items 120. In some embodiments the system 100 uses two different indexes: (1) a hash table 200; and, (2) an information retrieval system 210. It should be noted that in place of the hash table 200 any other data structure can be used so long as the data structure allows storage of counts for each of the sub-groups. In some embodiments, both the hash table 200 and the information retrieval system 210 are generated by a separate index generator (not shown) using the database of items 120. In some embodiments, the index generator runs on a desktop of a separate computing device to generate the hash table 200 and the information retrieval system 210. The hash table 200 and information retrieval system 210 then are copied onto the mobile device (such as a portable media player) running the augmented large index searching system 100 and method. The hash table 200 contains sub-strings and a count of the number of matches for each sub-string. However, it is impractical to have an entry in the hash table 200 for every possible sub-string of every possible item as this would use a great deal of storage space. Instead, the hash table 200 only contains entries for sub-strings with a count of matches greater than a hash threshold. For a count that is less than or equal to the hash threshold, the information retrieval system 210 is used to count the sub-string matches.

The information retrieval system 210 uses a sub-string matching technique. One such version of the technique utilizes and modifies the k-best suffix array as the primary data structure. Similar to traditional suffix arrays, k-best suffix arrays arrange all suffixes in the dictionary (such as query logs) into an array. However, k-best suffix arrays arrange the suffixes according to two alternating orders: the usual lexicographical ordering plus an ordering based on the numeric figure of merit. Because the k-best suffix array can be sorted by both lexicographic order and the figure of merit, it is a convenient data structure for finding k-most popular matches for a sub-string. Sub-strings can be expressed as wildcard queries, or queries that utilize wildcards (*) to match zero or more characters. In providing expansion choices, k-best suffix arrays can support both prefix matching (by appending a wildcard to the end of the text-so-far (such as "spea*" retrieves "speakeasy") as well as infix matching (by appending a wildcard to the beginning and end of the text-so-far (such as "*spea*" retrieves "britney spears") in a computationally efficient way.

In order to reduce memory footprint, some embodiments of the information retrieval system 210 exclude sub-string matching within words (such as "i-speak") and modify k-best suffix arrays to support only substring matching of word prefixes (such as "britney spears"). Technically, this modification is achieved by only allowing the k-best suffix array to contain pointers to the beginning of words. By making this modification, the memory footprint can be reduced by a factor of 5.

Referring to FIG. 2, the system 100 initially uses an empty sub-string 215 as input to a list selection module 220. When processed by the list selection module 220, this empty sub-string 215 returns virtually all of the items in the database of items 120. This empty sub-string 215 is used as input to the list selection module 220 just at the start-up of the system 100. Subsequent input to the list selection module 220 is revised sub-strings, as explained in detail below.

In general, the list selection module 220 processes the input sub-string to determine whether to present a list of items to the user in an augmented list view or a regular list view. As shown by the dotted lines in FIG. 2, the list selection module 220 makes this determination by using the hash table 200, the information retrieval system 210, or both. Note that list view (augmented or regular) is a view of the augmented list of items or the regular list of items that is presented or displayed to a user.

Depending on which list view is selected, the system 100 sends the sub-string currently being processed to either an augmented list generation module 230 or a regular list generation module 240. The augmented list generation module 230 uses the hash table 200 and the information retrieval system 210 to generate an augmented list. The regular list generation module 240 uses the information retrieval system 210 to generate a regular list. After generation of either the augmented list or the regular list, a list augmentation module 250 is used to augment either list with a variety of visual representations. These list augmentations are discussed in detail below.

The output of the list augmentation module 250 is either an augmented list view of items 255 (if the list selection module 220 selected the augmented list view) or a regular list view of items 260 (if the list selection module 220 selected the regular list view). Either the augmented list view of items 255 or the regular list view of items 260 then is sent to a sub-string revision module 270. The sub-string revision module 270 determines whether the item desired by the user is in the augmented list view of items 255 or the regular list view of items 260. If the desired item 140 is found on the list, then the user can select the item.

If the desired item is not in either list view, then the sub-string revision module 270 revises the current sub-string based on an additional character for the sub-string that is pinned by the user. Pinning is the act of adding a character to the sub-string by moving the cursor in a certain way (such as to the right). Pinning serves to revise the current sub-string and further narrow the search for the desired item 140. This revised sub-string 280 serves as input to the list selection module 220 and the process repeats until the desired item is found or the user determines that the desired item 140 is not in the database of items 120.

III. Operational Details

Figure 3:
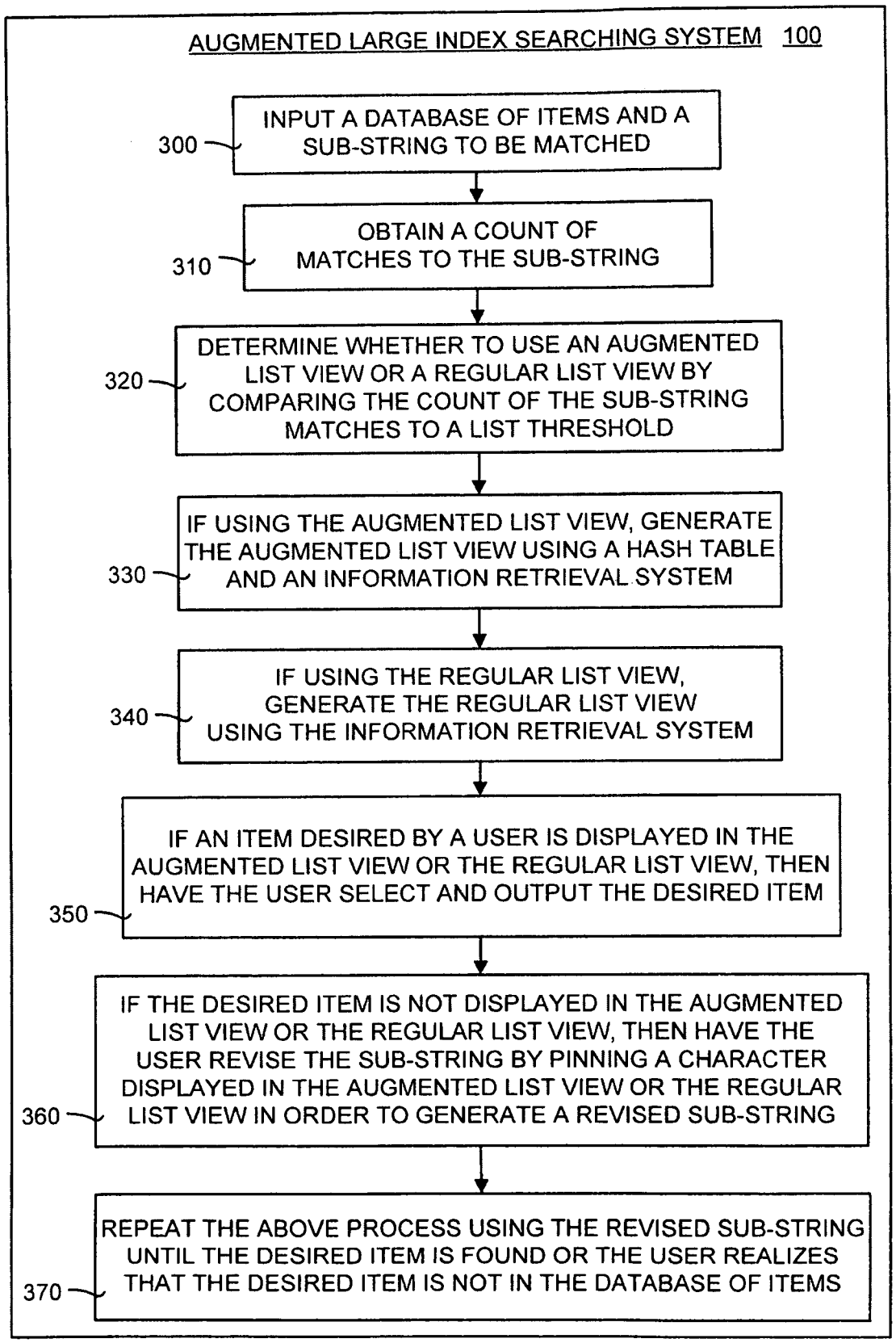
FIG. 3 is a flow diagram illustrating details of the operation of embodiments of the augmented large index searching system and method shown in FIGS. 1 and 2.

FIG. 3 is a flow diagram illustrating details of the operation of embodiments of the augmented large index searching system 100 and method shown in FIGS. 1 and 2. In general, the augmented large index searching method takes the database of items 120, presents at least some of the items to a user in an augmented list based on a sub-string search, and determines whether the augmented list contains the item that is wanted by the user. If the desired item 140 is found, then the user can select the item 140 from the augmented list. Otherwise, the user can refine the sub-string search by pinning a character. Pinning adds the character to the sub-string search and narrows the search. The method then processes the refined sub-string search to generate an updated augmented list and presents this list to the user. This is an iterative process that is continued until the user finds the desired item 140 or until it becomes apparent that the desired item 140 is not in the database of items.

More specifically, referring to FIG. 3, the method of the augmented large index searching system 100 begins by inputting a database of items and a sub-string to be searched (box 300). As noted above, this database typically contains hundreds of thousands (or millions) of items. Next, the method obtains a count of matches to the sub-string (box 310). Initially, the sub-string used is the empty sub-string 215. However, subsequent sub-strings contain revisions to the empty sub-string 215.

Next, the method determines whether to use an augmented list view or a regular list view (box 320). This determination is made by comparing the count of the sub-string matches to a list threshold. This process is explained in detail below. This list threshold typically is set in advance by a user or automatically. It should be noted that the hash table 200 does not contain data for all possible sub-strings because this would require an immense amount of storage space. As explained below, a hash threshold is used to constrain the size of the hash table 200. If the augmented list view is selected, then the method generates the augmented list view using the hash table 200 and the information retrieval system 210 (box 330). If the regular list view is selected, then the method generates the regular list view using the information retrieval system 210 (box 340).

The augmented list view or the regular list view then is presented to a user. If an item that is desired by the user is displayed in the augmented list view or the regular list view, then the user can select and output the desired item 140 (box 350). If the desired item is selected the method terminates.

If the desired item 140 is not displayed in the augmented list view or the regular list view, then the user can revise the sub-string currently being used by pinning a character displayed in the augmented list view or the regular list view (box 360). This pinning of character generates the revised sub-string 280. The above method or process then is repeated and using the revised sub-string 280 (box 370). This iterative process continues until the desired item 140 is found or the user realizes that the desired item 140 is not in the database of items 120. It should be noted that even if the desired item 140 is in the augmented list view or the regular list view the user can continue to revise the sub-string being processed by pinning characters. This is because the pinning feature is still active even after the desired item 140 appears on the augmented list view or the regular list view.

In some embodiments the user "pins" a character in order to add the character to the sub-string and create a revised sub-string. Before a character is pinned it is targeted for "pinning" by scrolling up or down to position a cursor (or other type of visual indicator) over the desired character in the augmented list view or the regular list view. The user then "pins" the desired character by moving the cursor to the right of the desired character. The revised sub-string generated as a result of this pinning action is processed as outlined above to obtain a revised list of items in either an augmented list view or a regular list view. If the user mistakenly pins a character, the pinned character can be unpinned by moving the cursor to the left.

III.A. List Selection Module

Figure 4:
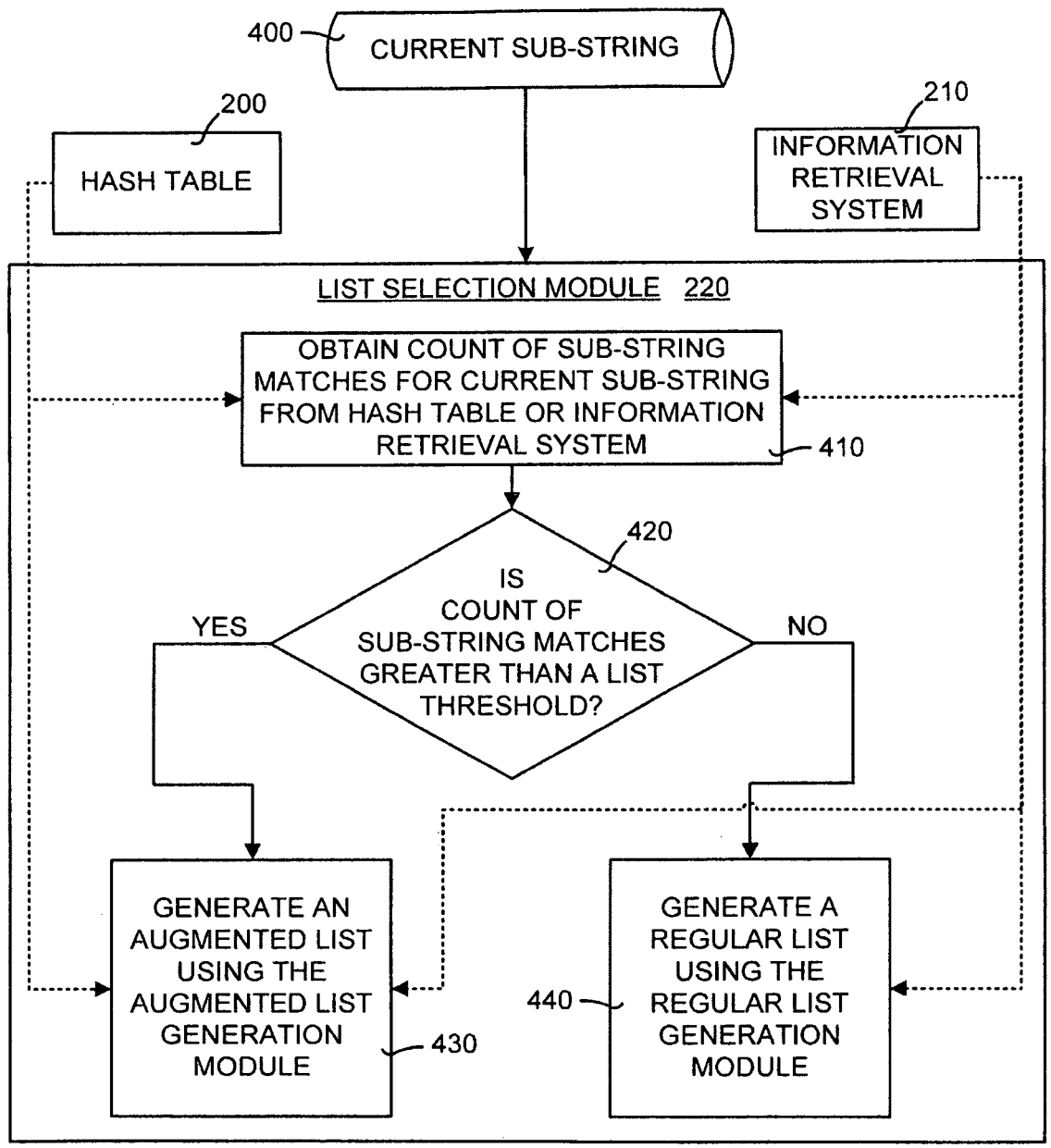
FIG. 4 is a flow diagram illustrating the detailed operation of embodiments of the list selection module shown in FIG. 2.

FIG. 4 is a flow diagram illustrating the detailed operation of embodiments of the list selection module 220 shown in FIG. 2. The module 220 receives a current sub-string 400 for matching. In addition, the hash table 200 and the information retrieval system 210 are input to the module 220.

The module 220 obtains a count of matches to the current sub-string from either the hash table 200 or the information retrieval system 210 (box 410). The sub-string matching is performed using one of three embodiments of sub-string matching techniques. A first embodiment uses prefix matching at word boundary. This involves try to match the beginning of every word. In other words, this technique searches for the prefix both at the beginning of a character string (such as an item name) and at a word boundary as defined by space where a new word begins. For example, if the sub-string is "tin", then prefix matching will match "tina turner" and "tina arena", and will also match "ike and tina turner". However, the sub-string "ina" would not match "ike and tina turner" because it is not at a word boundary.

A second embodiment uses prefix matching alone. Prefix matching matches just the beginning of a character string. For example, if the sub-string is "tin", then the prefix matching technique will match "tina turner" and "tina arena", but not "ike and tina turner", since the sub-string is not at the beginning of the character string. A third embodiment uses infix matching. Infix matching matches the sub-string anywhere in the character string. For example, if the sub-string is "ina", prefix matching would match "tina turner" and "christina".

Once a count of matches to the current sub-string is obtained, a determination is made as to whether the count of matches to the current sub-string is greater than a list threshold (box 420). If the count is greater than the list threshold, then the module 220 generates the augmented list using the augmented list generation module 230 (box 430). On the other hand, if the count is less than or equal to the list threshold, then the module 220 generates the regular list using the regular list generation module 240 (box 440).

III.B. Augmented List Generation Module

Figure 5:
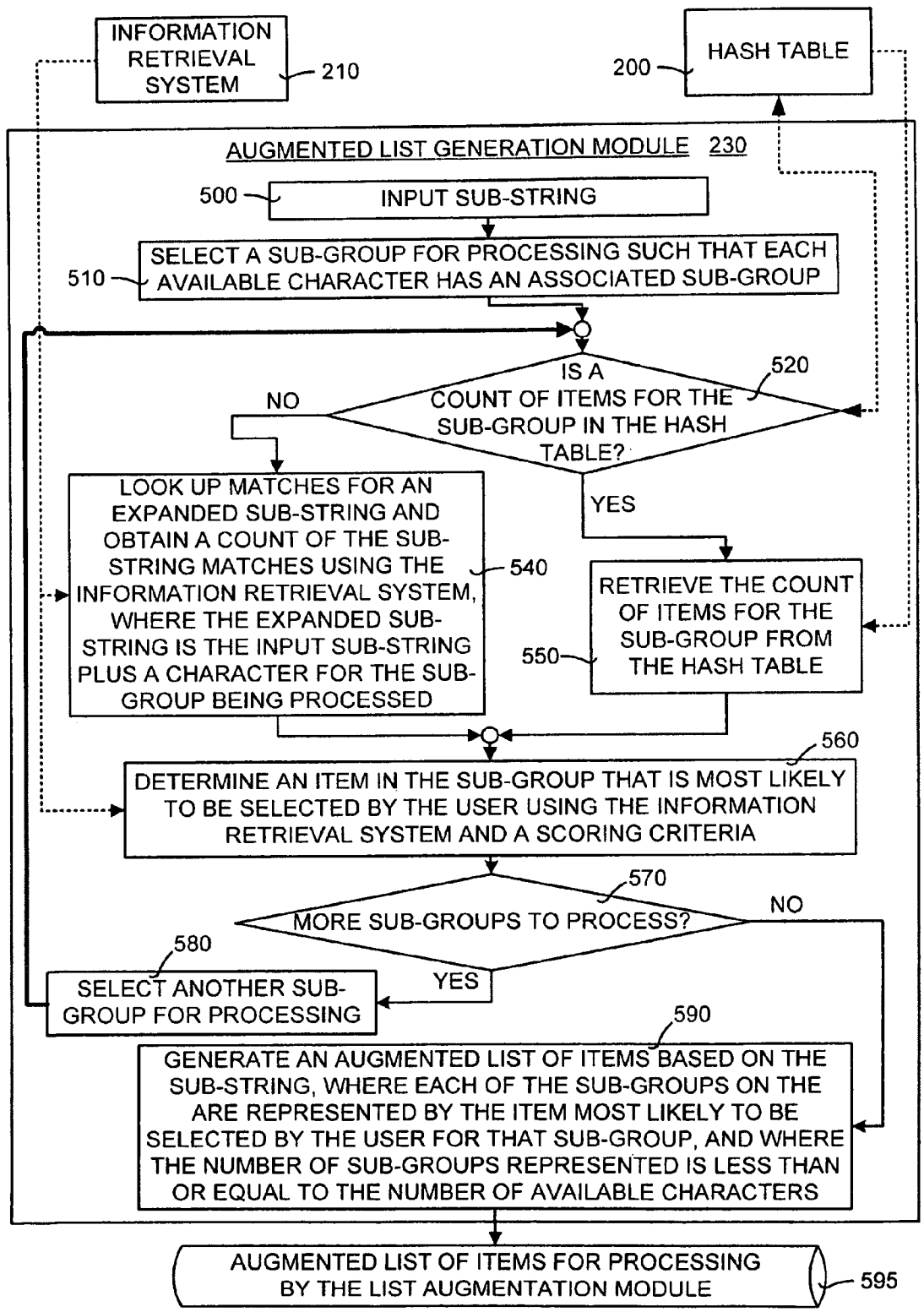
FIG. 5 is a flow diagram illustrating the detailed operation of embodiments of the augmented list generation module shown in FIG. 2.

FIG. 5 is a flow diagram illustrating the detailed operation of embodiments of the augmented list generation module 230 shown in FIG. 2. In general, the augmented list generation module 230 generates an augmented list of items using the hash table 200 and the information retrieval system 210. In particular, the augmented list generation module 230 begins by inputting a sub-string (box 500) for processing. The module 230 then selects a sub-group for processing such that each available character has an associated sub-group (box 510). For example, if the database of items 120 is in English, then the available characters are the numbers 0-9, the letters A-Z, and the "space" character. This gives a total of 37 available characters for a database of items 120 in English. This also means that for English the maximum number of sub-groups corresponds to the number of available characters (in other words, 37 sub-groups). The following iteration in the module 230 is performed for each available sub-group.

Once the sub-group to be processed is selected, then a determination is made as to whether the hash table 200 contains an entry for a count of items for that sub-group (box 520). If the hash table 200 does not contain the count of items for that sub-group, then the module 230 looks up matches for an expanded sub-string and obtains a count of the expanded sub-string matches using the information retrieval system 210 (box 540). The expanded sub-string is defined as the input sub-string plus a character representing the sub-group currently being processed. By way of example, if the input sub-string is "A" and character representing the sub-group currently being processed is "B", then the expanded sub-string would be "AB." At the next iteration, the expanded sub-string would be "AC" then "AD," "AE," and so forth until each sub-group associated with each available character has been processed.

If the hash table 200 contains the count of items for the sub-group, then the module 230 retrieves the count of items from the hash table 200 (box 550). By way of example, if the items are names of music artists then the hash table 200 contains a count of how many artists match a particular sub-string. For the sub-string "A," the hash table 200 records how many artists start with the letter "A". This continues using "AA," "AB," "AC," and so forth, and for as long as there are more sub-string matches than the hash threshold. If the count of items is not in the hash table 200 this means the count of items is below the hash threshold and the count is not contained in the hash table 200. In this situation the information retrieval system 210 is used to obtain the count. It should be noted that list threshold can be a good choice for the hash threshold, and in some embodiments the hash threshold is equal to the list threshold.

The module 230 then determines an item in the sub-group that is most likely to be selected by the user (box 560). This is performed using the information retrieval system 210 and scoring criteria. Specifically, the scoring criteria can be a variety of criteria used to determine which item in the sub-group is most likely to be selected by the user. Some examples of scoring criteria include the general popularity of each item based on many users, and the specific popularity of each item based on a personal preference of a user. The measure of popularity can include the number of hits each item receives or the number of times an item was opened. Moreover, other scoring criteria include how recently an item was used, such that an item used more recently than another item is more likely to be selected by the user. In addition, the scoring criteria can include recommendations of other users or professionals in the field to which the items are associated.

From the above discussion it should be noted that the augmented list generation module 230 uses both the hash table 200 and the information retrieval system 210. In general, when a sub-string is short and there are numerous sub-string matches, the hash table 200 affords the module 230 computational efficiency. When the sub-string becomes longer and the sub-string matches are fewer, then the information retrieval system 210 becomes an efficient way to count the matches. In general, the information retrieval system 210 is not usually an efficient way of extracting all the matches. It is only an efficient way of extracting the k best matches.

Thus, the module 230 uses the hash table 200 first. If the sub-string is not in the hash table 200, then the module 230 uses the information retrieval system 210 to extract all matches for the sub-string being processed. Note, however, that the information retrieval system 210 is used exclusively to find the most popular match. The hash table 200 does not contain the actual sub-string matches it just contains the number of matches to the sub-string. Thus, the hash table 210 cannot be used to find the most popular match.

The module 230 then makes a determination as to whether there are more sub-groups to process (box 570). If there are more sub-groups to process, then the module 230 selects another sub-group for processing (box 580). Once again, each sub-group has associated with it an available character. Using this sub-group associated with the available character the process as set forth above is performed for the new sub-group. The thick arrow in FIG. 5 shows that the new sub-group for processing is input to the process that includes process actions 520, 540, 550, 560, and 570.

If the determination is made in box 570 that there are no more sub-groups to process, the module 230 takes the data obtained from processing each of the sub-groups and generates the augmented list of the items based on the sub-string that was input (box 590). This augmented list does not list each item in each of the sub-groups. Instead, the augmented list contains an entry for each of the sub-groups that have items. Each sub-group entry is represented by the item in that particular sub-group that is most likely to be selected by the user if there are any items in that sub-group. Thus, the number of sub-groups represented will be less than or equal to the number of available characters (if the database of items 120 is in English, the number of available characters is 37). The process of the module 230 then terminates and the output is the augmented list of items for processing by the list augmentation module 250 (box 595).

III.C. Regular List Generation Module

Figure 6:
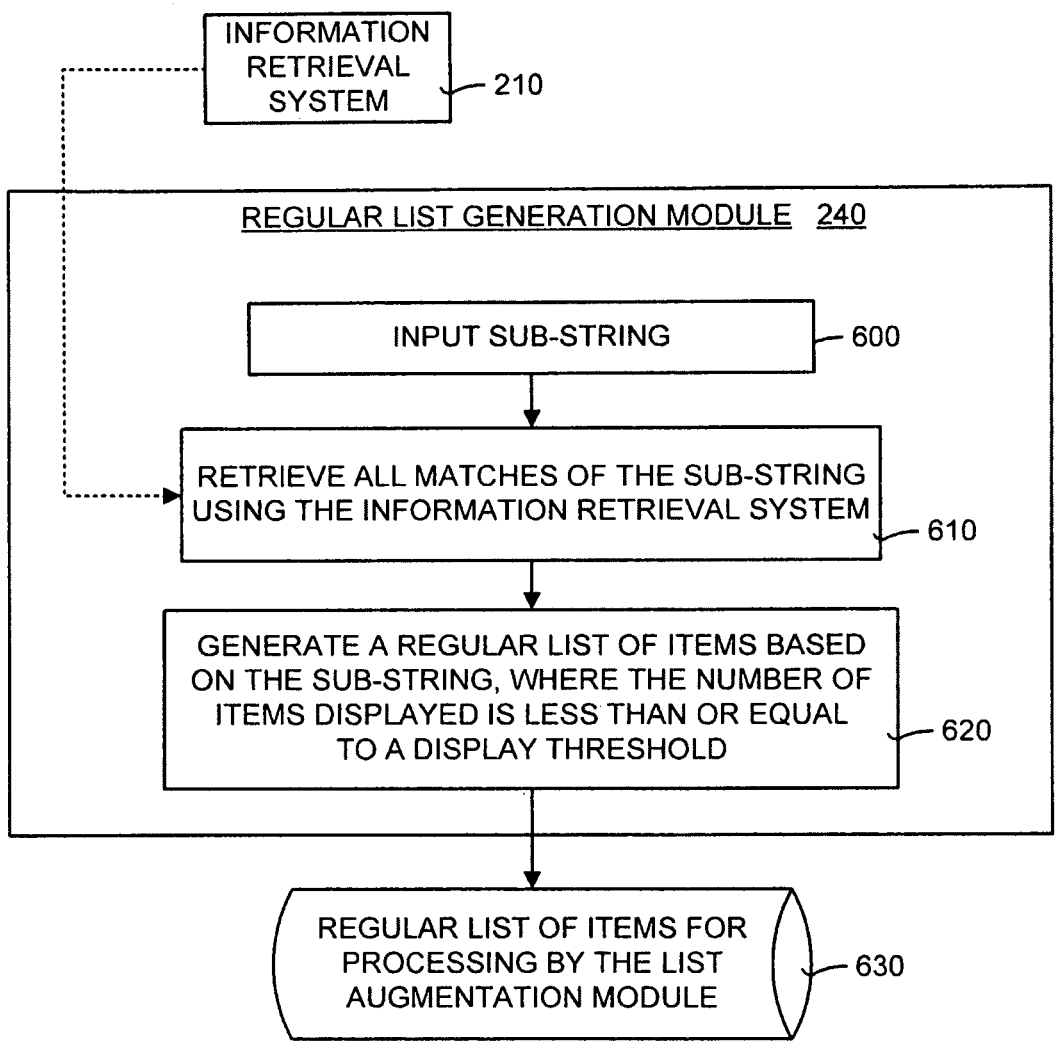
FIG. 6 is a flow diagram illustrating the detailed operation of embodiments of the regular list generation module shown in FIG. 2.

FIG. 6 is a flow diagram illustrating the detailed operation of embodiments of the regular list generation module 240 shown in FIG. 2. In general, the regular list generation module 240 generates a regular list of items using the information retrieval system 210. More specifically, the regular list generation module 240 inputs a sub-string (box 600) currently being processed and then retrieves each of the matches of the sub-string using the information retrieval system 210 (box 610).

Once the matches are retrieved, then the module 240 uses this information to generate a regular list of items based on the sub-string (box 620). The number of items displayed in the regular list view is less than or equal to the list threshold. The module 240 then outputs the regular list of items for processing by the list augmentation module 250 (box 630).

III.D. List Augmentation Module

Figure 7:
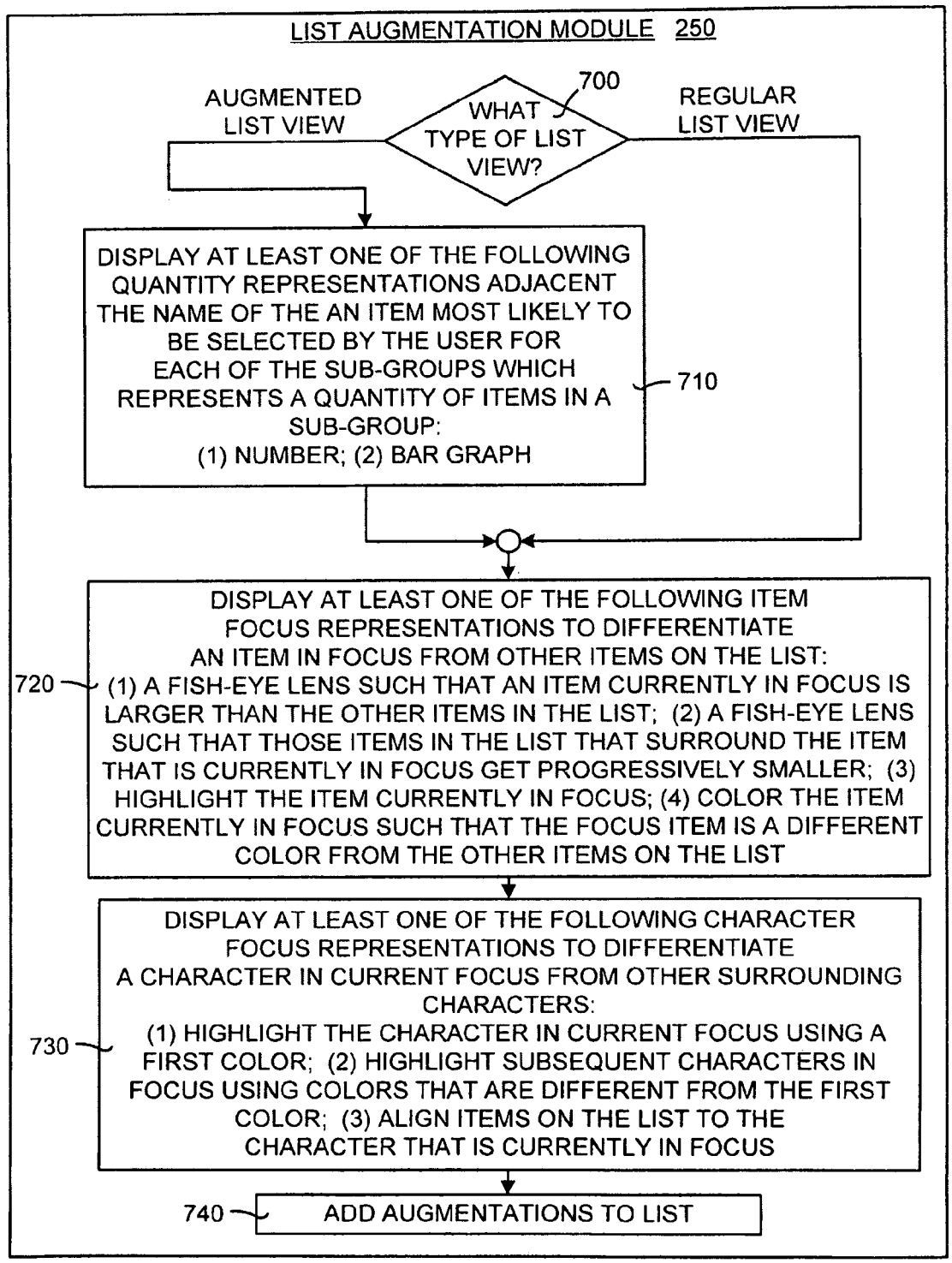
FIG. 7 is a flow diagram illustrating the detailed operation of embodiments of the list augmentation module shown in FIG. 2.

FIG. 7 is a flow diagram illustrating the detailed operation of embodiments of the list augmentation module 250 shown in FIG. 2. In general, the list augmentation module 250 takes the augmented list of items or the regular list of items and augments either list by adding visual representations to them. In particular, the module 250 inputs either the augmented list of items or the regular list of items and makes a determination as to the type of list view (box 700). If the list view is an augmented list view, then the module 250 displays at least one of the following quantity representations for each of the sub-groups: (1) a number; (2) a bar graph (box 710). This quantity representation is displayed in the augmented list view adjacent the name of the item that is most likely to be selected by the user.

For both the augmented list view and the regular list view, the module 250 uses visual representations to differentiate between focus items. A focus item is an item that is currently being examined by a user. The module 250 seeks to visually distinguish between an item in focus and other items on the list. In some embodiments the module 250 displays at least one of the following item focus representations to differentiate an item in focus from other items on the list (box 720): (1) a fish-eye lens such that an item currently in focus is larger than the other items in the list; (2) a fish-eye lens such that those items in the list that surround the item that is currently in focus get progressively smaller; (3) highlight the item currently in focus; (4) color the item currently in focus such that the focus item is a different color from the other items on the list.

Also, it should be noted that two things are in focus on the list displayed to the user: (1) a character; and (2) an item. A character is part of the item. Similar to the item in focus, the module 250 seeks to visually distinguish between a character in focus and surrounding characters. In general, this visually distinguishing can use whatever means are available, such as coloring, highlighting, shading, size, and so forth.

In some embodiments the module 250 also displays at least one of the following character focus representations to differentiate a character in current focus from other surrounding characters (box 730): (1) highlight the character in current focus using a first color; (2) highlight subsequent characters in focus using colors that are different from the first color; (3) align items on the list to the character that is currently in focus. For example, in some embodiments the first character is highlighted with a red foreground while the second character is highlighted with an orange background. The above augmentations then are added to the augmented list view or the regular list view (box 740).

In some embodiments the list augmentation module also displays an ellipsis (" . . . ") or some other appropriate visual representation on the augmented list view. An ellipsis is used to visually indicate to a user that there are more items to view. In particular, the list augmentation module 270 includes four embodiments. A first embodiment includes no ellipses in either type of list view. This may occur when there are no further items either above or below the items in the list. A second embodiment includes an ellipsis at the top of the augmented list view and is used to indicate that there are additional items above the items currently being shown in the list view. A third embodiment includes an ellipsis at the bottom of the augmented list view and is used to indicate that there are additional items below the items currently being shown. A fourth embodiment is a first ellipsis at the top of the augmented list view (above the items currently being displayed in the list view) and a second ellipsis at the bottom of the augmented list view (below the items currently being displayed in the list view). This indicates that there are additional items on the list both above and below the items currently being displayed on the list.

III.E. Sub-String Revision Module

Figure 8:
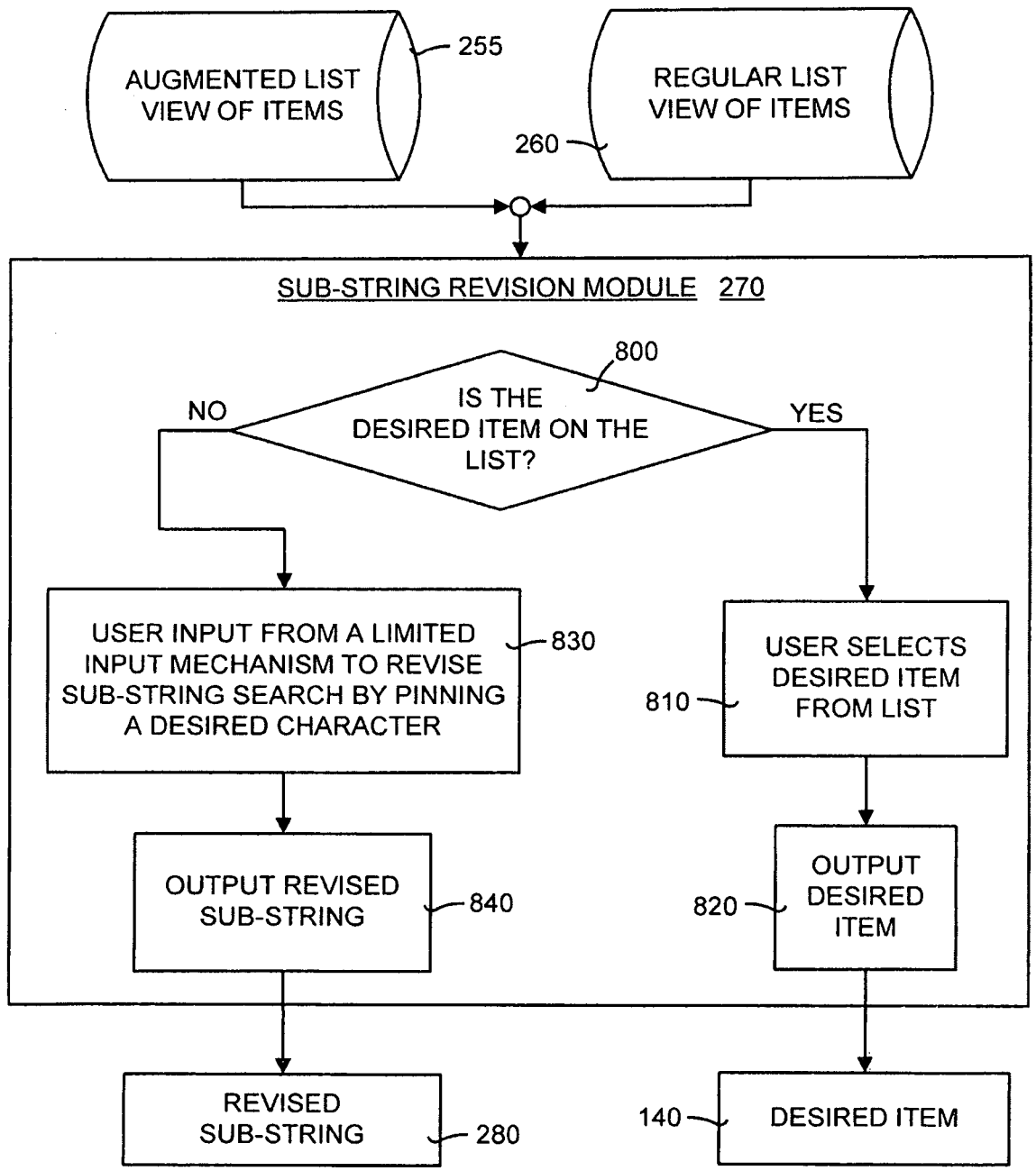
FIG. 8 is a flow diagram illustrating the detailed operation of embodiments of the sub-string revision module shown in FIG. 2.

FIG. 8 is a flow diagram illustrating the detailed operation of embodiments of the sub-string revision module 270 shown in FIG. 2. In general, the module 270 inputs the augmented list view of items 255 or the regular list view of items 260, and determines whether the sub-string needs revision in view of the either of the lists. If necessary, the module 270 also revises the sub-string based on input from the user.

More specifically, the augmented list view of items 255 and the regular list view of items 260 are input to the sub-string revision module 270. The module 270 then makes a determination as to whether the item desired by the user is on either the augmented list view 255 or the regular list view 260 (box 800). If the desired item 140 is on the list, then the user selects the desired item from the list (box 810). As stated above, the user does not have to select the desired item from the list view, she is able to continue revising the sub-string if she wants to by pinning additional characters. If the user does select the desired item from the list view, then the desired item 140 is output from the module 270 (box 820).

If the desired item 140 is not on either list, then the module 270 accepts user input from a limited input mechanism (box 830) and revises the current sub-string being processed by adding a character to the sub-string. This character is a character on the augmented list view or the regular list view that has been pinned by the user. The module then outputs the revised sub-string 280 (box 840). It should be noted that the user input does not have to be from a limited input mechanism, it may be from a computing device having a keyboard.

IV. Exemplary Example of the Augmented List View and Regular List View

Figure 9:
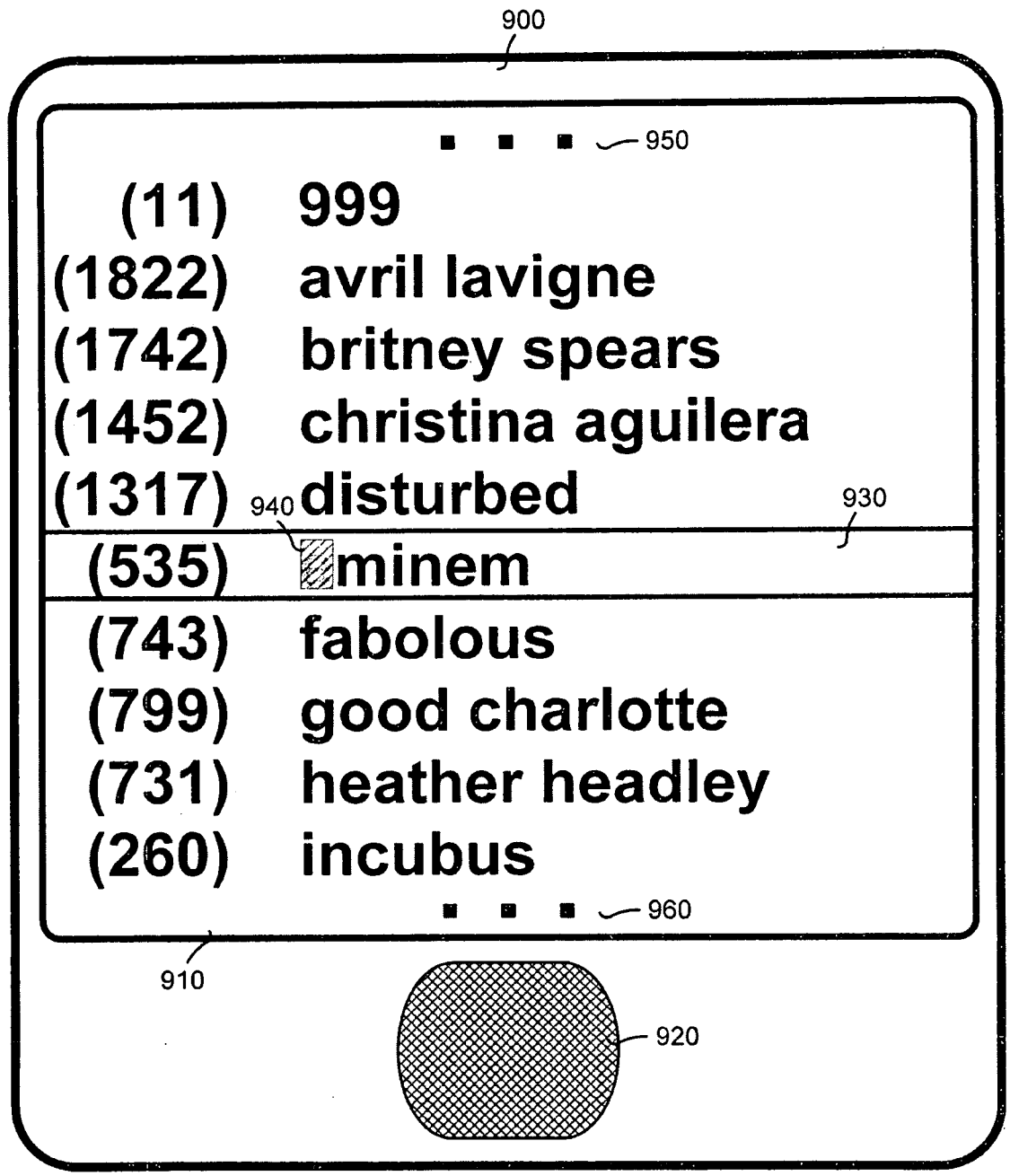
FIG. 9 is an exemplary example of one embodiment of the augmented list user interface of the augmented large index searching system and method shown in FIGS. 1-8.

FIG. 9 is an exemplary example of one embodiment of the augmented list user interface of the augmented large index searching system 100 and method shown in FIGS. 1-8. This particular embodiment allows a user to quickly find items from a large index of items. In this example the large index (or database) of items is a music library that contains approximately 10,000 artists. In FIG. 9 is shown a generic portable media player 900 having a display area 910 and a directional pad (d-pad) 920 that serves as a limited input mechanism. Note that in FIGS. 9-14 the augmented list view of items is shown, while in FIGS. 15-18 the regular list view of items is shown. Referring to FIG. 9, the music library is arranged in sub-groups that are arranged alphabetically, with the most popular item in that sub-group displayed as a representation of that sub-group and with the most popular item initially focused in the middle, if possible. For example, in FIG. 9, the most popular music artist that begins with the letter "a" is "avril lavigne." Thus, the sub-group for the letter "a" is represented by "avril lavigne." Moreover, initially the artist "eminem" is focused and highlighted, meaning that "eminem" is the most popular artist out of the artist's names that are listed.

The user interface of FIG. 9 also includes an item focus representation of highlighting the item in focus. In particular, "eminem" is highlighted on the display area 910 using a highlight bar 930 in order to distinguish that line containing "eminem" from other artists listed. Moreover, the user interface of FIG. 9 also includes a character focus representation of highlighting the character in focus using a first background color. Specifically, a cursor 940 having a first color highlights the letter "e" on the line containing "eminem." FIG. 9 also includes a quantity representation adjacent the artist's name. The number to the left of "eminem" indicates how many artists are in the sub-group of the highlighted letter "e." FIG. 9 also includes a first ellipsis 950 and a second ellipsis 960. The first ellipsis 950 indicates that there are more sub-groups above the line that reads "(11) 999" that are not shown in the display area 910. Similarly, the second ellipsis 960 indicates that there are additional sub-groups below the line that reads "(260) incubus" that are not shown in the display area 910.

Figure 10:
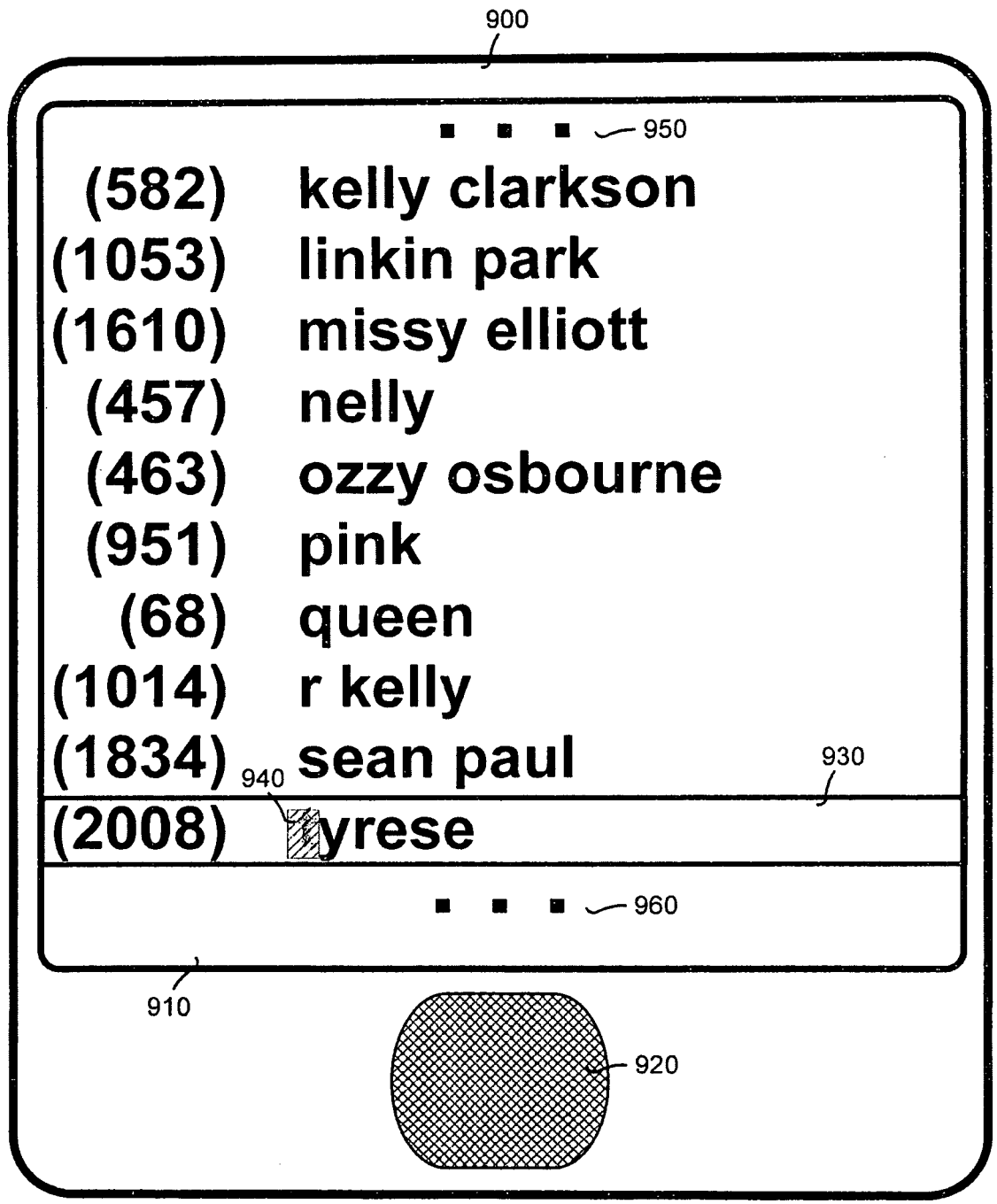
FIG. 10 illustrates the acquisition of a first desired character on a list of the exemplary example shown in FIG. 9.

Assume that the user (not shown) is looking for the artist "tina turner." The user then uses limited input mechanism (the d-pad 920) to scroll down the list to the line that represents the letter "t." FIG. 10 illustrates the acquisition of a first desired character on a list of the exemplary example shown in FIG. 9. In FIG. 10 note that the highlight bar 930 now highlights the "t" sub-group, with the artist "tyrese" representing this sub-group (because she is the most popular artist in the "t" sub-group). At this point, the user can "pin" the letter "t" by moving the cursor 940 to the right of the letter "t." The first ellipsis 950 and the second ellipsis 960 indicate that there are more sub-groups above the "(582) kelly clarkson" line and below the "(2008) tyrese" line that are not shown in the display area 910.

Figure 11:
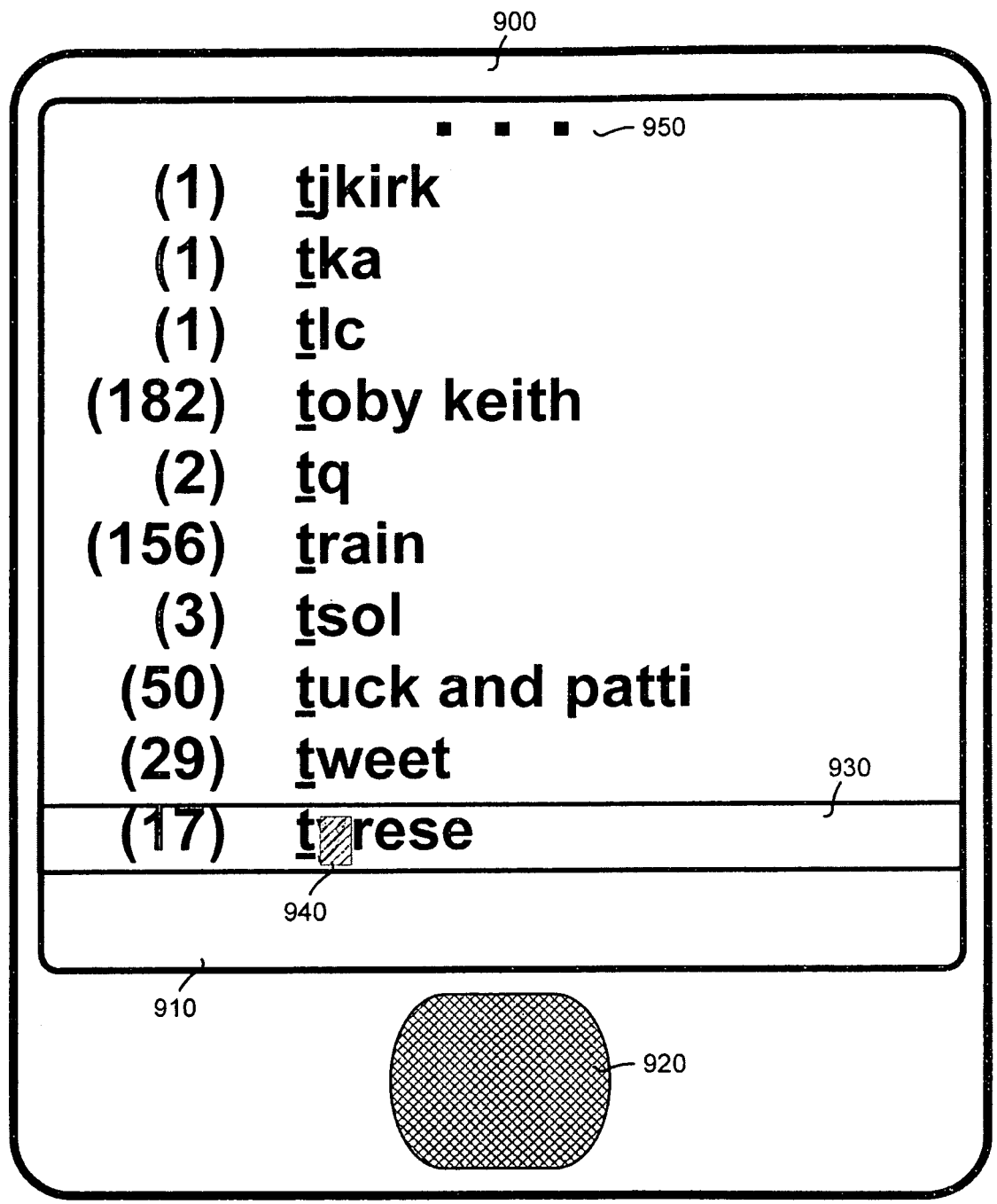
FIG. 11 illustrates the results of pinning the first desired character in the list of the exemplary example shown in FIGS. 9 and 10.

FIG. 11 illustrates the results of pinning the first desired character in the list of the exemplary example shown in FIGS. 9 and 10. Note that the list has been revised as a result of this pinning. As shown in FIG. 11, the cursor 940 is now positioned such that is highlights the "y" letter. In addition, the letter "t," which has been pinned, is indicated as pinned by an underlining of the first letter "t" each of the sub-groups in the list. In alternate embodiments, this pinning indication could be shown in a variety of ways, such as different coloring, shading, or highlighting. The effect of pinning the letter "t" is that each of the sub-groups or items starting with "t" then is displayed in the revised list. As shown in FIG. 11, the revised list is again in alphabetical order with the alphabetical ordering based on the second letter (as the first letter for each sub-group is "t"). Note that FIG. 11 contains only the first ellipsis 950, since there are more sub-groups above the line that reads "(1) tjkirk" that are not shown in the display area 910. However, there is no second ellipsis 960, since there are no other sub-groups below the line that reads "(17) tyrese."

Figure 12:
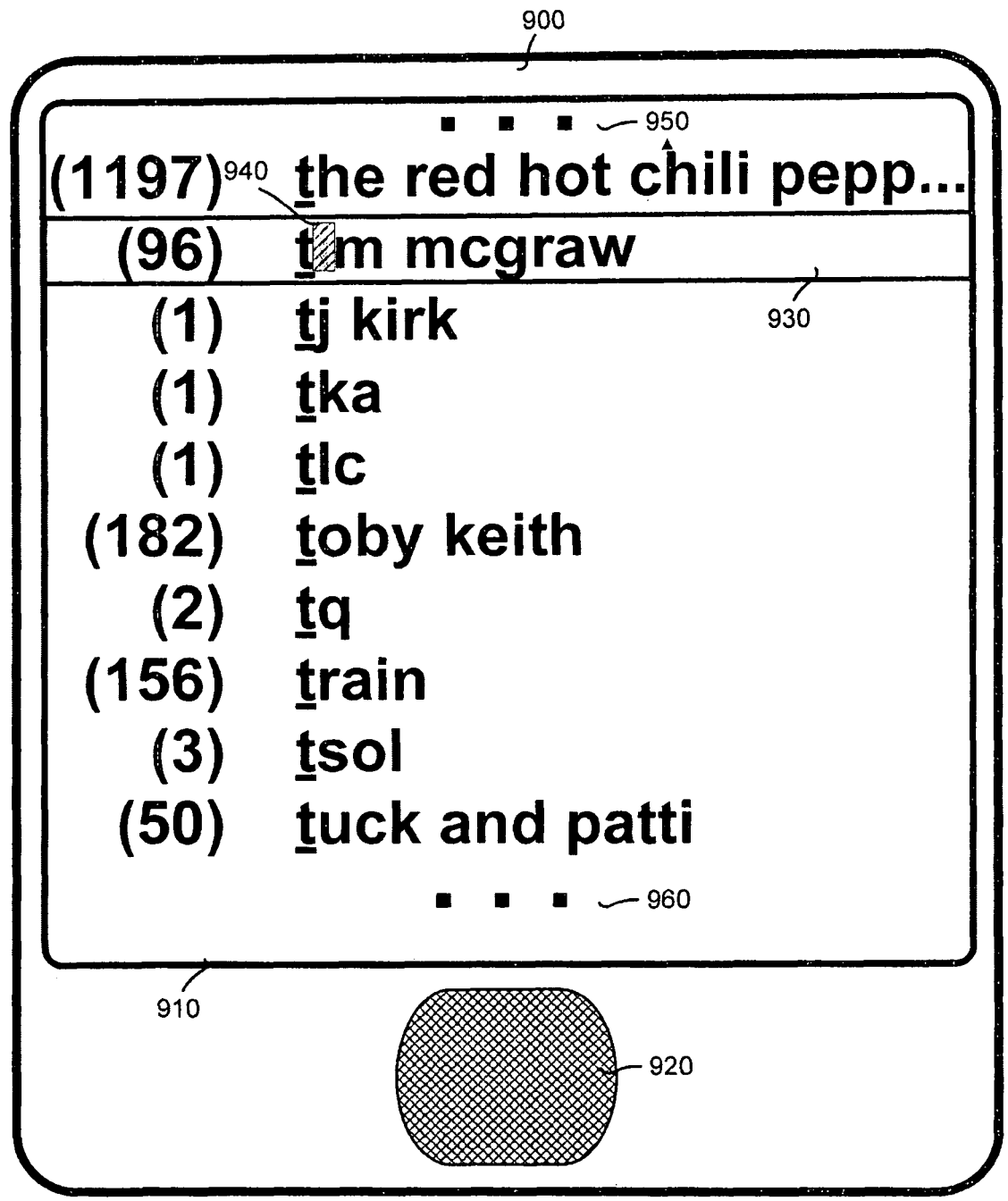
FIG. 12 illustrates the acquisition of a second desired character on the list of the exemplary example shown in FIGS. 9-11.

Since in this example the desired item is "tina turner," the user scrolls up using the d-pad 920 to the "ti" sub-group. FIG. 12 illustrates the acquisition of a second desired character on the list ("ti") of the exemplary example shown in FIGS. 9-11. It should be noted that "tim mcgraw" is the most popular artist of the "ti" sub-group, and that there are 96 artists in that sub-group, as indicated by the number in parentheses to the left of the name "tim mcgraw." The first ellipsis 950 and the second ellipsis 960 indicate that there are more sub-groups above the "(1197) the red hot chili pepp . . . " line and below the "(50) tuck and patti" line that are not shown in the display area 910.

Figure 13:
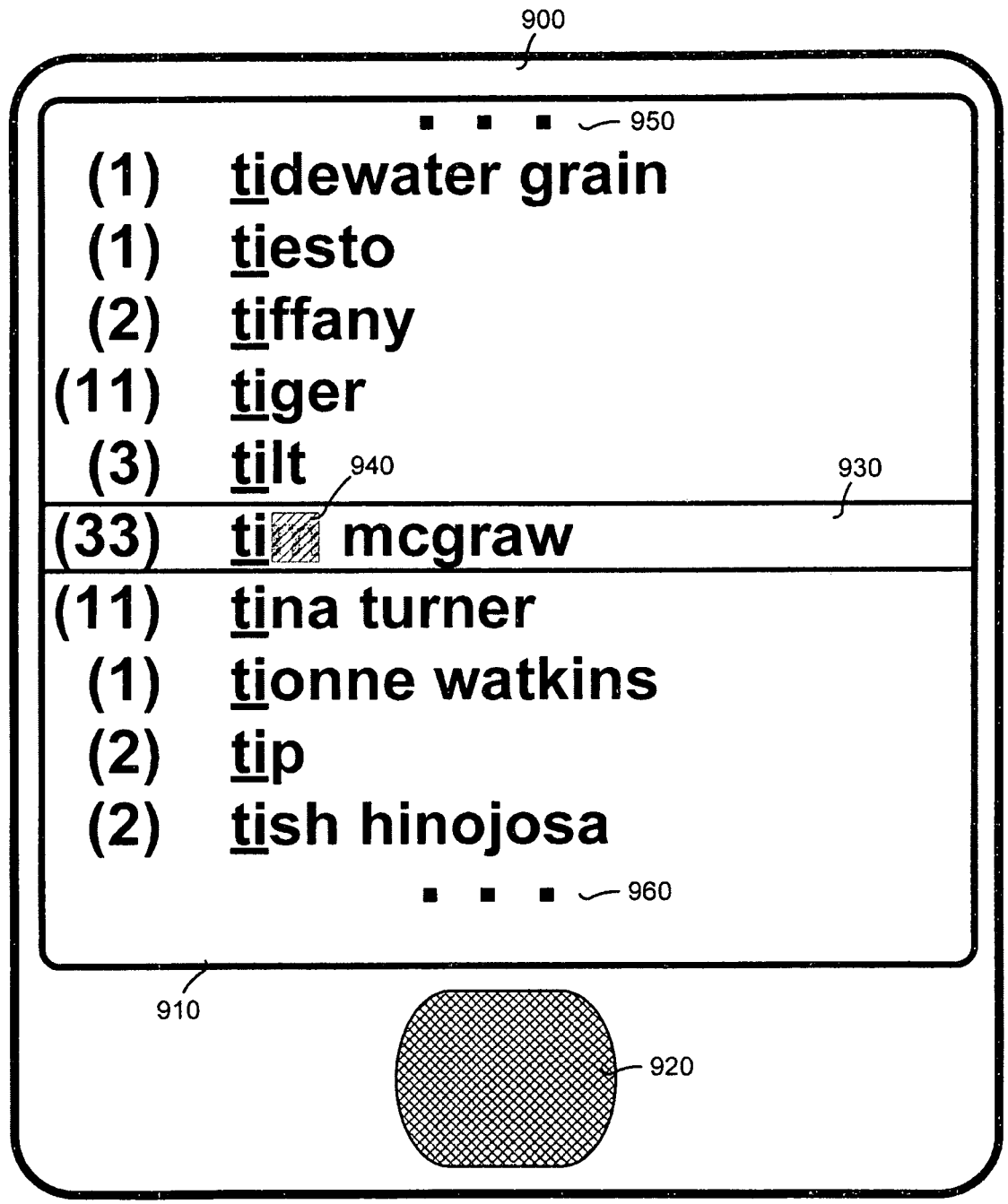
FIG. 13 illustrates the results of pinning the second desired character on the list of the exemplary example shown in FIGS. 9-12.

The user then pins the "i" by moving the cursor 940 to the right. FIG. 13 illustrates the results of pinning the "i" on the list of the exemplary example shown in FIGS. 9-12. Note that the list has been revised again as a result of this pinning. As shown in FIG. 13, the cursor 940 is now on the letter "m" and the letter "i" has been pinned. This pinning is indicated by an underlining of the first two letters "ti" each of the sub-groups in the list. The effect of pinning the letters "ti" is that each of the items starting with "ti" then is displayed in the revised list. As shown in FIG. 13, the revised list is again in alphabetical order with the alphabetical ordering based on the third letter (as the first two letters for each sub-group are "ti"). Note that the first ellipsis 950 and the second ellipsis 960 indicate that there are more sub-groups above the "(1) tidewater grain" line and below the "(2) tish hinojosa" line that are not shown in the display area 910.

Figure 14:
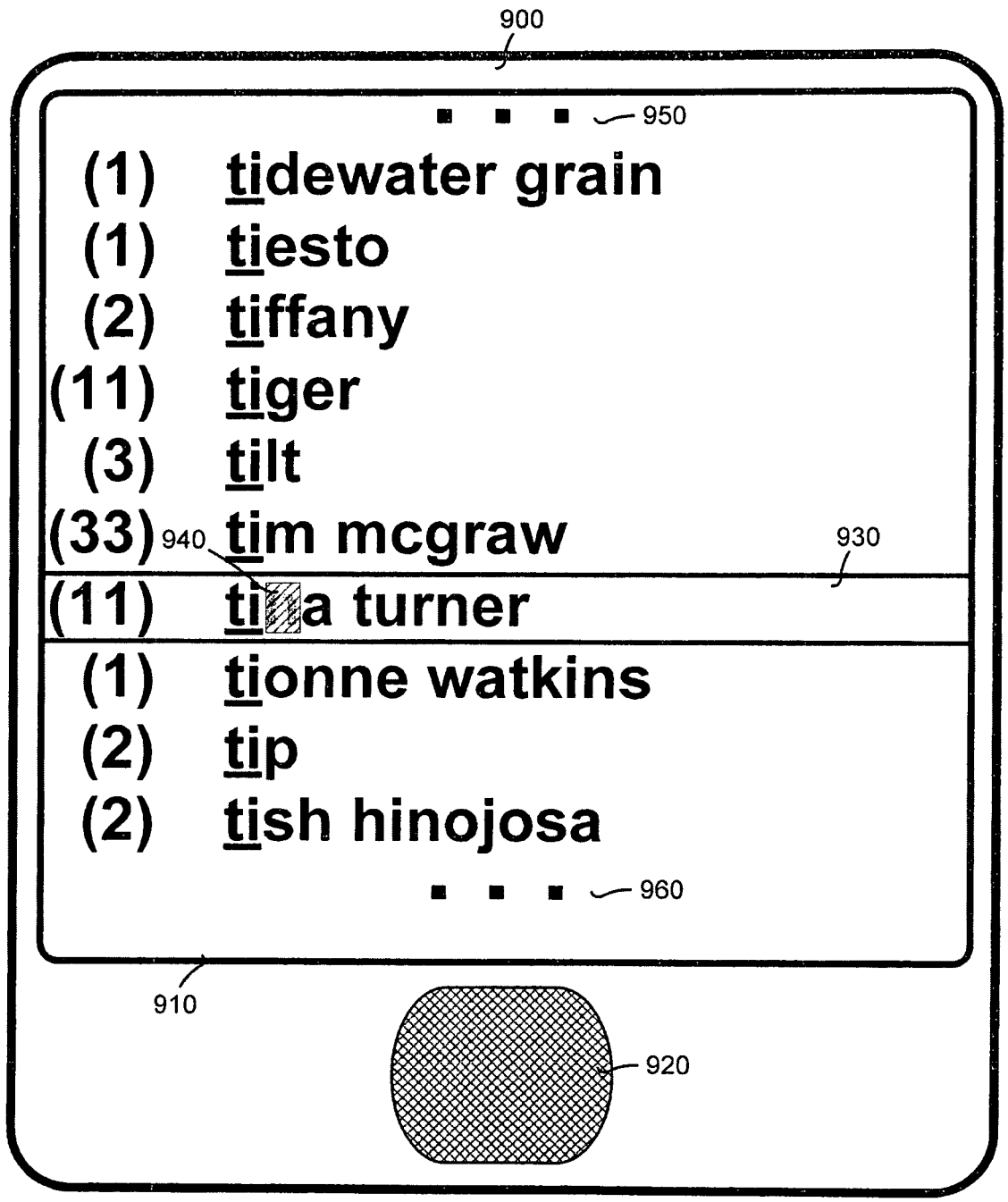
FIG. 14 illustrates the acquisition of a third desired character on a list of the exemplary example shown in FIGS. 9-13.

It should be noted that the desired item "tina turner" is now displayed on the revised list shown in FIG. 13. Thus, the user merely has to scroll down one item to select "tina turner." This is shown in FIG. 14, which illustrates the acquisition of a third desired character ("n") on a list of the exemplary example shown in FIGS. 9-13. However, for pedagogical purposes it is beneficial to show the effects of continuing to pin letters.

Figure 15:
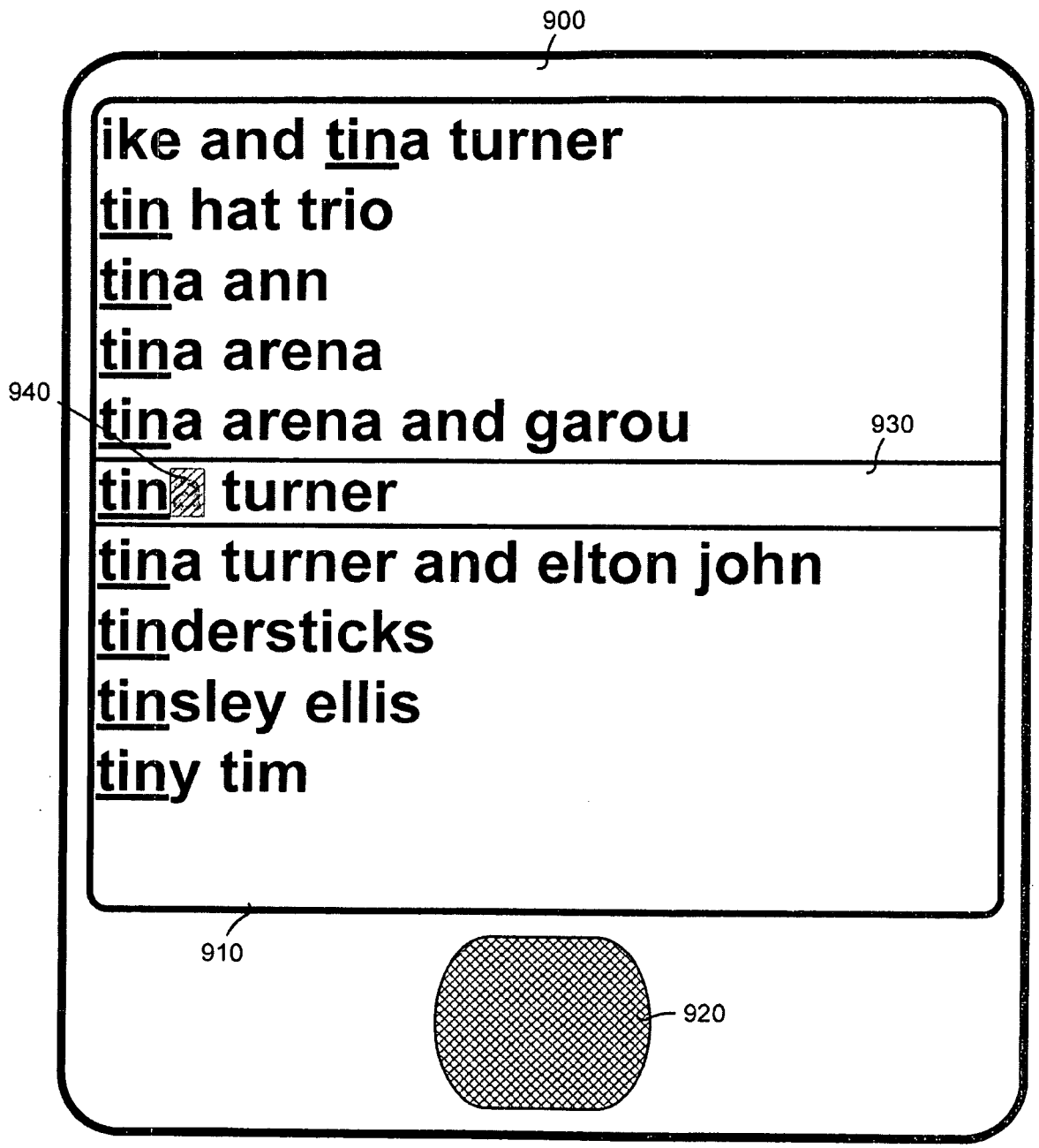
FIG. 15 illustrates the results of pinning the third desired character on the list of the exemplary example shown in FIGS. 9-14.

The user then pins the "n" by moving the cursor 940 to the right. FIG. 15 illustrates the results of pinning the "n" on the list of the exemplary example shown in FIGS. 9-14. Note that the list has been revised again as a result of this pinning. As shown in FIG. 15, the cursor 940 is now on the letter "a" and the letter "n" has been pinned. This pinning is indicated by an underlining of the three letters "tin" each of the sub-groups in the list. The effect of pinning the letters "tin" is that each of the items starting with "tin" then is displayed in the revised list. As shown in FIG. 15, the revised list is again in alphabetical order with the alphabetical ordering based on the entire string since it is switched to the regular list.

It should be noted that FIGS. 15-18 are shown the regular list views of items, and that there are no quantity representations. In addition, the first ellipsis 950 and the second ellipsis 960 are not necessary because the entire list of items is shown in the display area 910. This is because the number of sub-string matches is less than or equal to the list threshold of 10 (for this example). As explained in connection with FIG. 4, this means that the sub-string matching now is being performed by the information retrieval system 210 and that the quantity representation is no longer being used on the user interface.

It should also be noted that prefix matching at word boundaries is being used in this example. As explained in connection with FIG. 4, prefix matching at word boundaries means that this technique searches for the prefix at the beginning of a character string (such as an artist's name) and at a word boundary as defined by space where a new word begins. Thus, the pinned letters form a sub-string "tin" that returns matches for all artist's names beginning with "tin" along with "ike and tina turner," since "tina" is at a word boundary.

Figure 16:
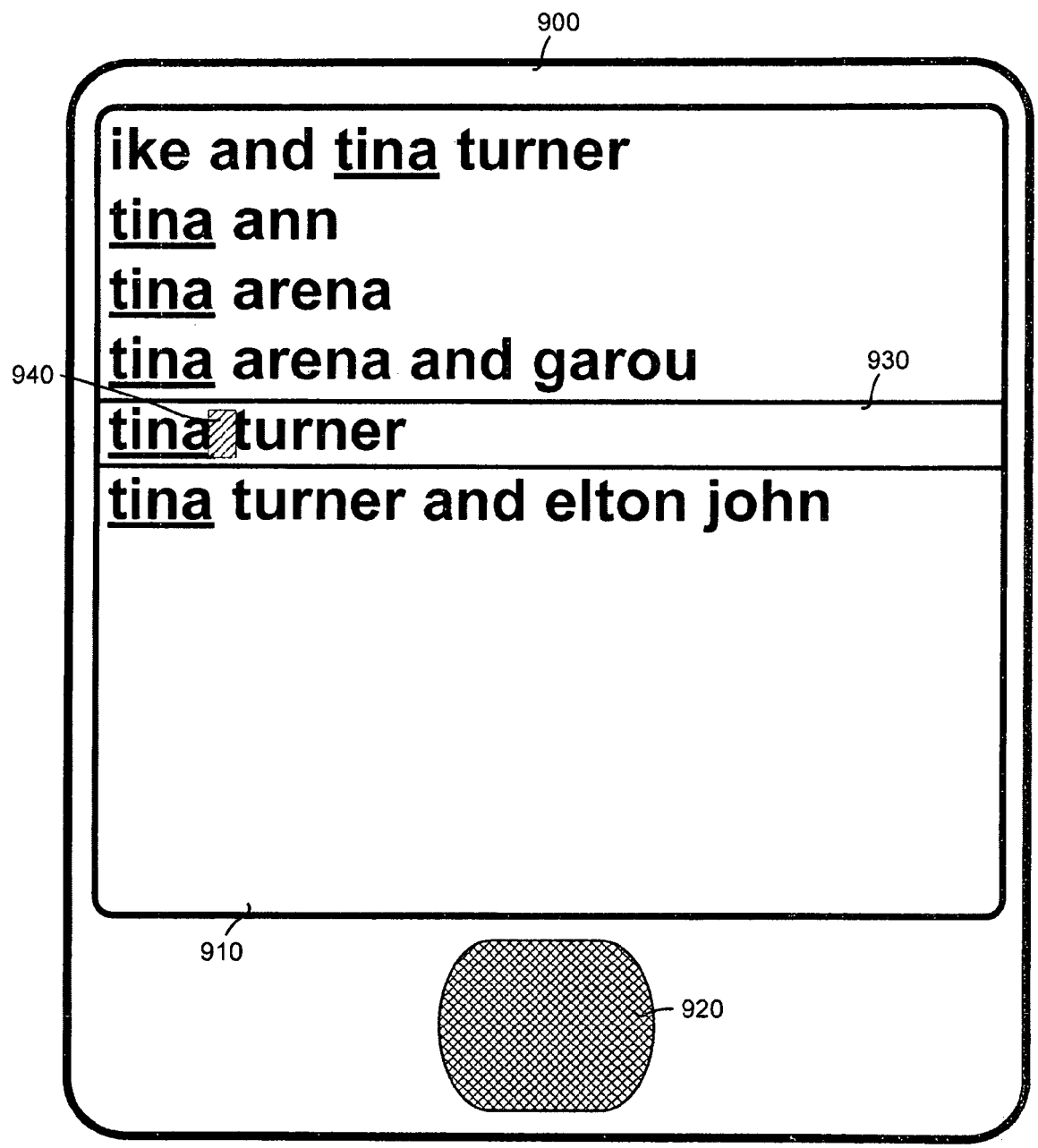
FIG. 16 illustrates the results of pinning a fourth desired character on the list of the exemplary example shown in FIGS. 9-15.

The user then pins the "a" by moving the cursor 940 to the right. FIG. 16 illustrates the results of pinning the "a" on the list of the exemplary example shown in FIGS. 9-15. Note that the list has once again been revised as a result of this pinning. As shown in FIG. 16, the cursor 940 is now on the space character " " and the letter "a" has been pinned. This pinning is indicated by an underlining of the first four letters "tina" each of the sub-groups in the list. The effect of pinning the letters "tina" is that each of the items starting with "tina" then is displayed in the revised list. As shown in FIG. 16, the revised list is again in alphabetical order.

Figure 17:
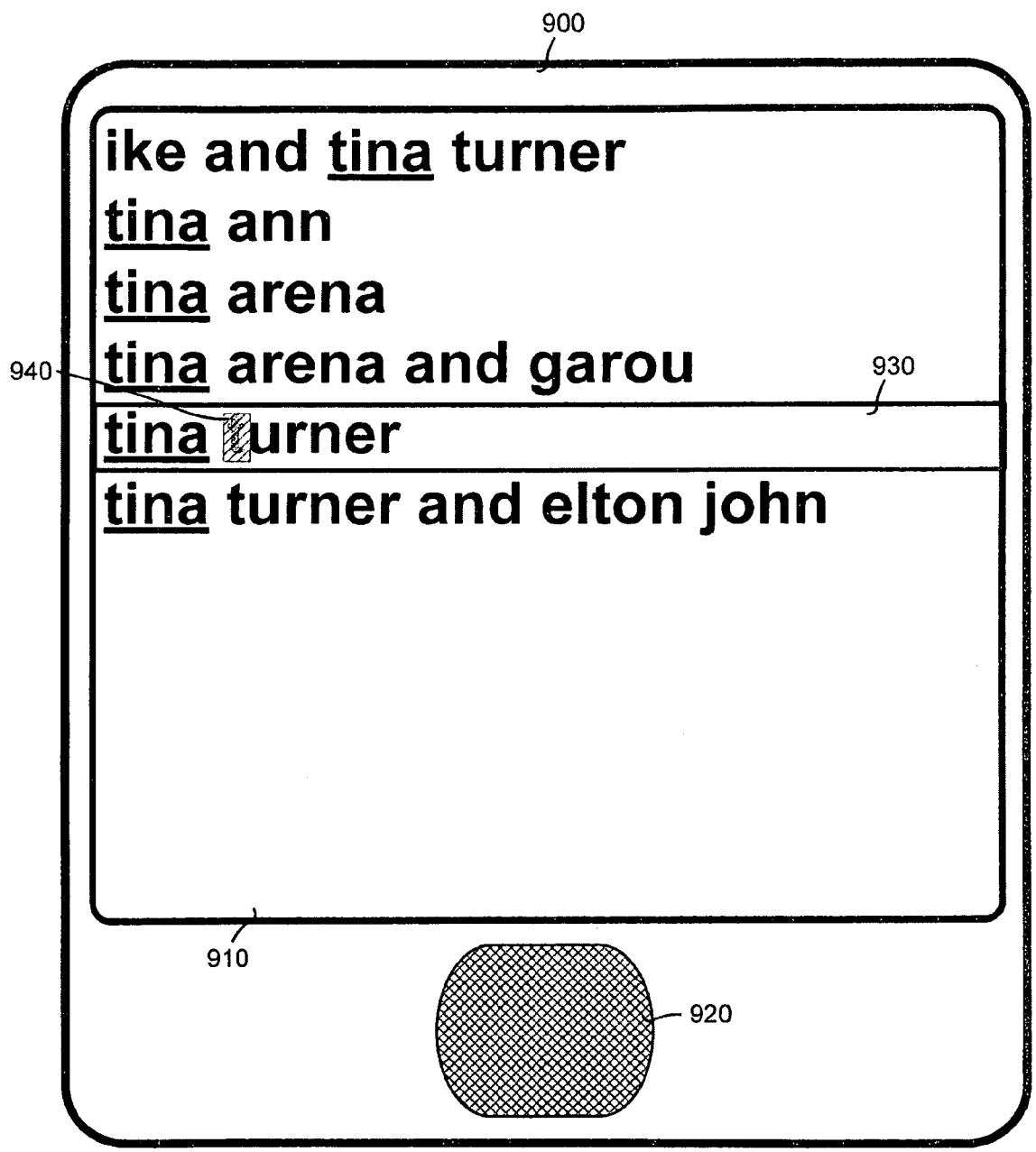
FIG. 17 illustrates the acquisition of a fifth desired character on a list of the exemplary example shown in FIGS. 9-16.
Figure 18:
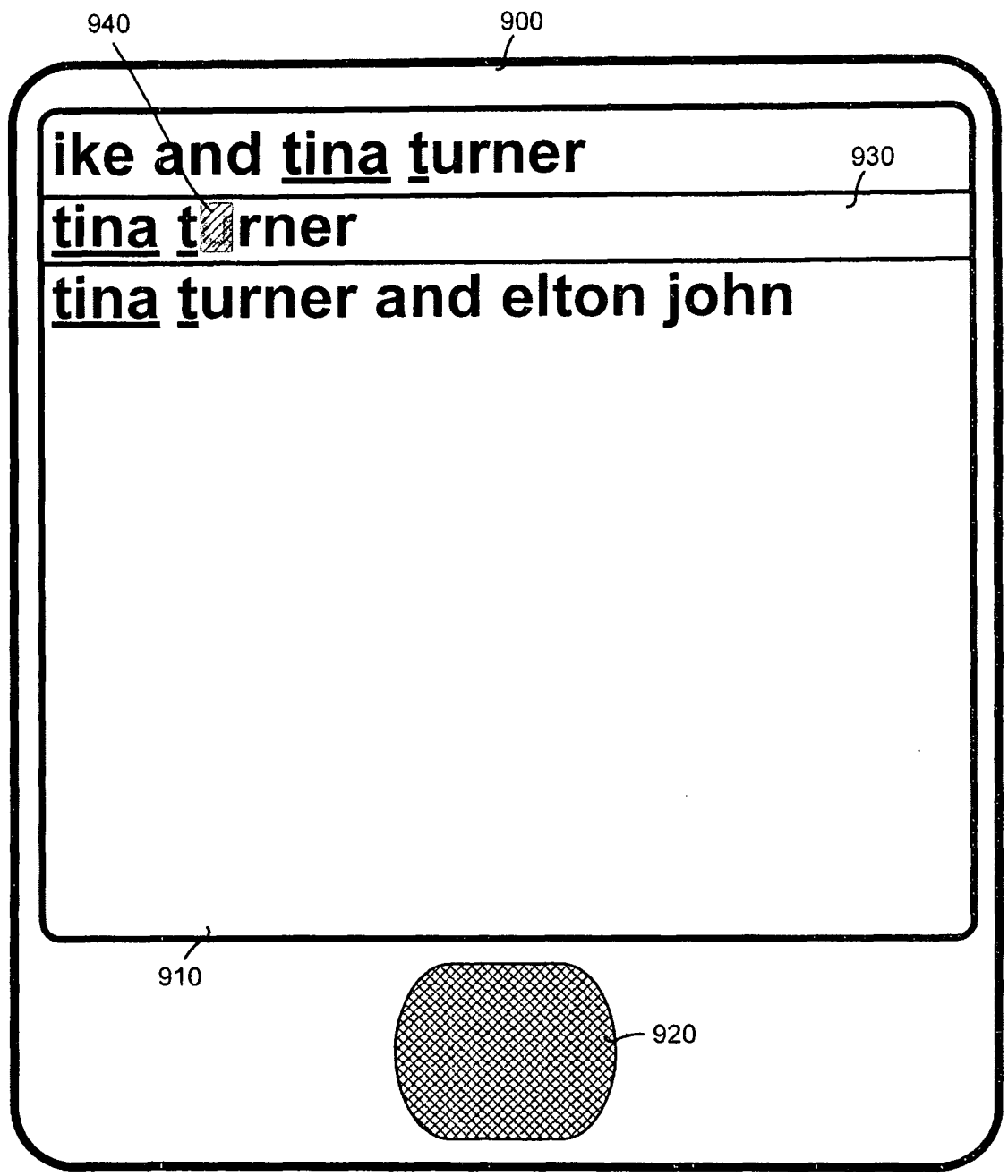
FIG. 18 illustrates the results of pinning a fifth desired character on the list of the exemplary example shown in FIGS. 9-17.

FIG. 17 illustrates the acquisition of a fifth desired character on a list of the exemplary example shown in FIGS. 9-16. In this case, the user wants a sub-string of "tina t." As shown FIG. 17, the user positions the cursor 940 over the letter "t" in "turner." The user then pins the "t" by moving the cursor 940 to the right. FIG. 18 illustrates the results of pinning the "t" on the list of the exemplary example shown in FIGS. 9-17. Note that the list has once again been revised as a result of this pinning. As shown in FIG. 18, the cursor 940 is now on the letter "u" and the letter "t" has been pinned. This pinning is indicated by an underlining of the letters in the character string "tina t" in each of the sub-groups in the list. The effect of pinning the letters "tina t" is that each of the items starting with "tina t" then is displayed in the revised list. As shown in FIG. 18, the revised list is again in alphabetical order. It can be seen from FIG. 18 that the desired artist, "tina turner," is in each of the three remaining items on the list.

V. Exemplary Operating Environment

Embodiments of the augmented large index searching system 100 and method are designed to operate in a computing environment. The following discussion is intended to provide a brief, general description of a suitable computing environment in which embodiments of the augmented large index searching system 100 and method may be implemented.

Figure 19:
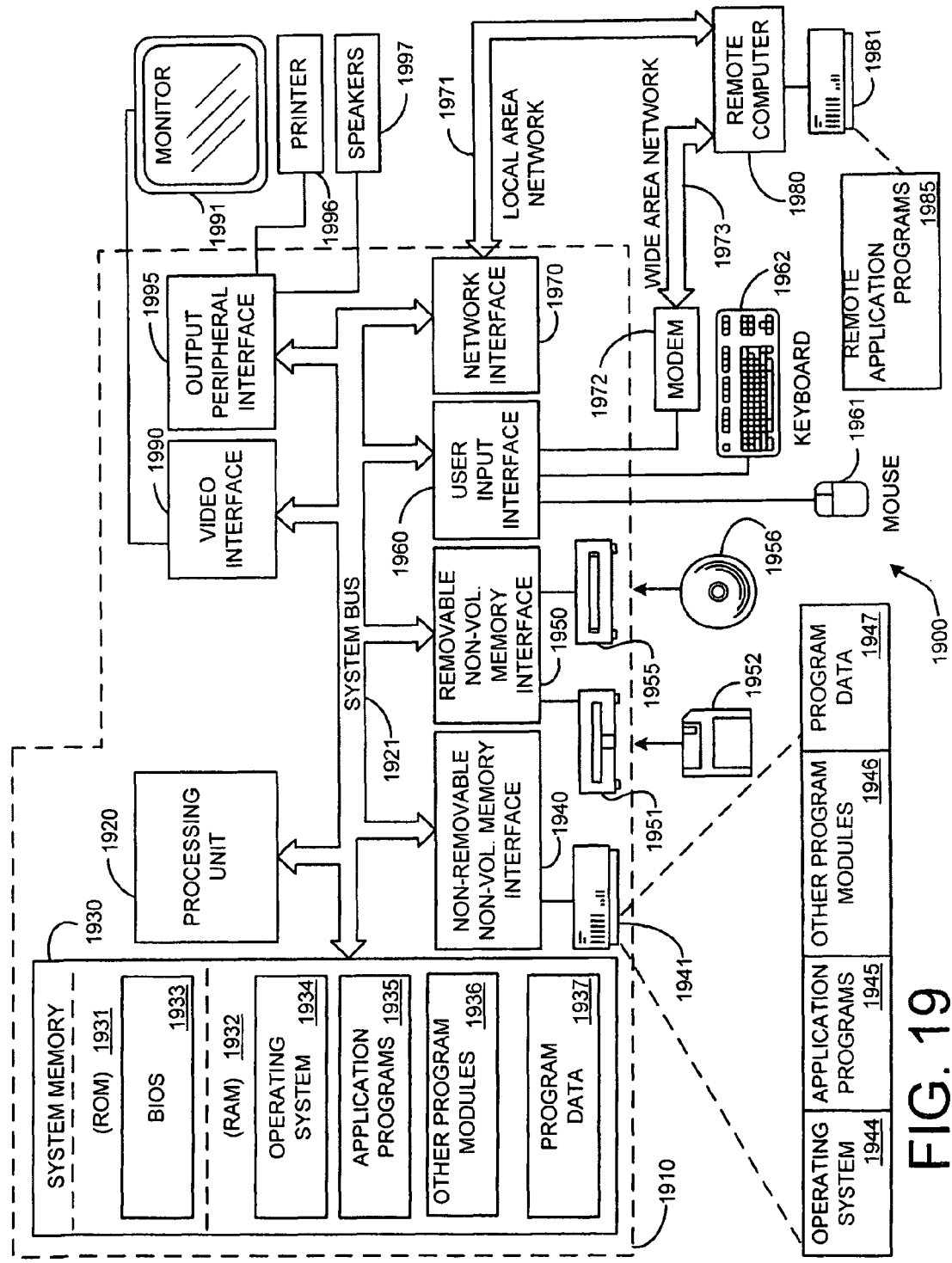
FIG. 19 illustrates an example of a suitable computing system environment in which embodiments of the augmented large index searching system and method shown in FIGS. 1-18 may be implemented.

FIG. 19 illustrates an example of a suitable computing system environment in which embodiments of the augmented large index searching system and method shown in FIGS. 1-18 may be implemented. The computing system environment 1900 is only one example of a suitable computing environment and is not intended to suggest any limitation as to the scope of use or functionality of the invention. Neither should the computing environment 1900 be interpreted as having any dependency or requirement relating to any one or combination of components illustrated in the exemplary operating environment.

Embodiments of the augmented large index searching system 100 and method are operational with numerous other general purpose or special purpose computing system environments or configurations. Examples of well known computing systems, environments, and/or configurations that may be suitable for use with embodiments of the augmented large index searching system 100 and method include, but are not limited to, personal computers, server computers, handheld (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the augmented large index searching system 100 and method may be described in the general context of computer-executable instructions, such as program modules, being executed by a computer. Generally, program modules include routines, programs, objects, components, data structures, etc., that perform particular tasks or implement particular abstract data types. Embodiments of the augmented large index searching system 100 and method may also be practiced in distributed computing environments where tasks are performed by remote processing devices that are linked through a communications network. In a distributed computing environment, program modules may be located in both local and remote computer storage media including memory storage devices. With reference to FIG. 19, an exemplary system for augmented large index searching system 100 and method includes a general-purpose computing device in the form of a computer 1910.

Components of the computer 1910 may include, but are not limited to, a processing unit 1920 (such as a central processing unit, CPU), a system memory 1930, and a system bus 1921 that couples various system components including the system memory to the processing unit 1920. The system bus 1921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1910 typically includes a variety of computer readable media. Computer readable media can be any available media that can be accessed by the computer 1910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1910. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1940 includes computer storage media in the form of volatile and/or nonvolatile memory such as read only memory (ROM) 1931 and random access memory (RAM) 1932. A basic input/output system 1933 (BIOS), containing the basic routines that help to transfer information between elements within the computer 1910, such as during start-up, is typically stored in ROM 1931. RAM 1932 typically contains data and/or program modules that are immediately accessible to and/or presently being operated on by processing unit 1920. By way of example, and not limitation, FIG. 19 illustrates operating system 1934, application programs 1935, other program modules 1936, and program data 1937.

The computer 1910 may also include other removable/non-removable, volatile/nonvolatile computer storage media. By way of example only, FIG. 19 illustrates a hard disk drive 1941 that reads from or writes to non-removable, nonvolatile magnetic media, a magnetic disk drive 1951 that reads from or writes to a removable, nonvolatile magnetic disk 1952, and an optical disk drive 1955 that reads from or writes to a removable, nonvolatile optical disk 1956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950.

The drives and their associated computer storage media discussed above and illustrated in FIG. 19, provide storage of computer readable instructions, data structures, program modules and other data for the computer 1910. In FIG. 19, for example, hard disk drive 1941 is illustrated as storing operating system 1944, application programs 1945, other program modules 1946, and program data 1947. Note that these components can either be the same as or different from operating system 1934, application programs 1935, other program modules 1936, and program data 1937. Operating system 1944, application programs 1945, other program modules 1946, and program data 1947 are given different numbers here to illustrate that, at a minimum, they are different copies. A user may enter commands and information (or data) into the computer 1910 through input devices such as a keyboard 1962, pointing device 1961, commonly referred to as a mouse, trackball or touch pad, a directional pad (d-pad), and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1920 through a user input interface 1960 that is coupled to the system bus 1921, but may be connected by other interface and bus structures, such as, for example, a parallel port, game port or a universal serial bus (USB). A monitor 1991 or other type of display device is also connected to the system bus 1921 via an interface, such as a video interface 1990. In addition to the monitor, computers may also include other peripheral output devices such as speakers 1997 and printer 1996, which may be connected through an output peripheral interface 1995.

The computer 1910 may operate in a networked environment using logical connections to one or more remote computers, such as a remote computer 1980. The remote computer 1980 may be a personal computer, a server, a router, a network PC, a peer device or other common network node, and typically includes many or all of the elements described above relative to the computer 1910, although only a memory storage device 1981 has been illustrated in FIG. 19. The logical connections depicted in FIG. 19 include a local area network (LAN) 1971 and a wide area network (WAN) 1973, but may also include other networks. Such networking environments are commonplace in offices, enterprise-wide computer networks, intranets and the Internet.

When used in a LAN networking environment, the computer 1910 is connected to the LAN 1971 through a network interface or adapter 1970. When used in a WAN networking environment, the computer 1910 typically includes a modem 1972 or other means for establishing communications over the WAN 1973, such as the Internet. The modem 1972, which may be internal or external, may be connected to the system bus 1921 via the user input interface 1960, or other appropriate mechanism. In a networked environment, program modules depicted relative to the computer 1910, or portions thereof, may be stored in the remote memory storage device. By way of example, and not limitation, FIG. 19 illustrates remote application programs 1985 as residing on memory device 1981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for obtaining an item desired by a user from a database of items, comprising:
   using a general-purpose computing device to perform the following:
      inputting an original sub-string to be matched to items in the database of items;
      obtaining a count of matches to the original sub-string of items in the database of items;
      comparing the count of sub-string matches to a list threshold to determine whether to use an augmented list view or a regular list view to present at least some of the items in the sub-string matches;
      determining whether the desired item is in the augmented list view or the regular list view;
      revising the original sub-string if the desired item is not in the augmented list view or the regular list view;
      determining that the desired item is not in the augmented list view or the regular list view;
      revising the original sub-string by:
         moving a visual indicator up or down over a desired character;
         moving the visual indicator to the right so as to pin the desired character and generate a revised sub-string; and
         alternating between moving the visual indicator up or down and then to the right in order to pin desired characters and obtain the desired item.

2. The method of claim 1, further comprising:
   finding that the count of sub-string matches is greater than the list threshold; and
   generating the augmented list view using a hash table and an information retrieval system such that the augmented list view contains sub-groups of items and each sub-group is represented by a single item in that sub-group.

3. The method of claim 2, further comprising:
   selecting a first sub-group for processing such that each available character has an associated sub-group; and
   determining whether a count of items for the first sub-group is in the hash table to retrieve the count of items for the first sub-group.

4. The method of claim 3, further comprising:
   finding that the count of items for the first sub-group is not in the hash table;
   looking up matches for an expanded sub-string, where the expanded sub-string is the original sub-string plus a character associated with the sub-group being processed; and
   obtaining a count of matches of the expanded sub-string using the information retrieval system.

5. The method of claim 3, further comprising:
   finding that the count of items for the first sub-group is in the hash table; and
   retrieving the count of items for the first sub-group from the hash table.

6. The method of claim 3, further comprising:
   determining an item in the sub-group being processed that is most likely to be selected by the user based on scoring criteria and using the information retrieval system; and
   representing the sub-group being processed by the item in the sub-group being processed that is most likely to be selected by the user.

7. The method of claim 6, further comprising displaying at least one of the following quantity representations adjacent a name of the item in the sub-group being processed that is most likely to be selected by the user:
(a) a number; or
(b) a bar graph, where the quantity representation represents a count of items in a sub-group.

8. The method of claim 6, further comprising:
repeating the above process actions for each sub-group;
generating the augmented list view of items based on the original sub-string; and
representing each of the sub-groups by its respective item in the sub-group being processed that is most likely to be selected by the user, where the number of sub-groups is less than or equal to a number of available characters.

9. The method of claim 1, further comprising:
finding that the count of sub-string matches is less than or equal to the list threshold; and
generating the regular list view using an information retrieval system.

10. The method of claim 9, further comprising:
retrieving matches of the original sub-string using the information retrieval system; and
generating the regular list view of items based on the original sub-string, where a number of items in the regular list view is less than or equal to the list threshold.

11. The method of claim 1, further comprising:
defining an item in focus as an item on which a cursor is over in the augmented list view or the regular list view; and
displaying at least one of the following item focus representations to differentiate the item in focus from other items on the augmented list view or the regular list view:
(a) a fish-eye lens such that the item in focus is larger than the other items on the augmented list view or the regular list view;
(b) a fish-eye lens such that those items on the augmented list view or the regular list view that surround the item in focus get progressively smaller;
(c) highlight the item in focus; or
(d) color the item in focus such that the item in focus is a different color from the other items on the augmented list view or the regular list view.

12. The method of claim 11, further comprising:
defining a character in focus as a character in the item in focus on which the cursor is over; and
displaying at least one of the following character focus representations to differentiate the character in focus from other surrounding characters:
(a) highlight the character in focus using a first color;
(b) highlight subsequent characters in focus using colors that are different from the first color; or
(c) align items on the augmented list view or the regular list view to the character in focus.

13. A process for searching a database of items for a specific item in the database of items, comprising:
using a general-purpose computing device to perform the following:
obtaining matches of an original sub-string using a matching technique;
organizing the sub-string matches into sub-groups containing items from the database of items;
associating a single available character with the sub-group of items such that a number of sub-groups is less than or equal to a number of available characters;
for each of the sub-groups, select an item in the sub-group to represent that sub-group using the information retrieval system and based on scoring criteria;
generate an augmented list view of items containing sub-group representations of at most each of the sub-groups where the sub-group representation for each of the sub-groups is a name of the item in the sub-group selected to represent that sub-group;
determining whether the specific item is contained in the augmented list view;
targeting a desired character for pinning by positioning a cursor over the desired character in the augmented list view of items;
revising the original sub-string by:
moving the cursor up or down over a desired character;
moving the cursor to the right so as to pin the desired character to the original sub-string and to generate a revised sub-string that includes the pinned character; and
alternating between moving the visual indicator up or down and then to the right in order to pin desired characters and obtain the desired item.

14. The process of claim 13, further comprising:
obtaining a count of matches to the revised sub-string; and
determining whether to use the augmented list view or a regular list view by comparing the count of revised sub-string matches to a list threshold.

15. The process of claim 14, further comprising:
determining that the count of matches to the revised sub-string is greater than the list threshold;
selecting a sub-group for processing from the matches such that each available character has an associated sub-group;
determining whether a count of items in the sub-group being processed is contained in a hash table;
if the count of items is not contained in the hash table, then defining an expanded sub-string as the revised sub-string plus a character from the available characters for the sub-group being processed and looking up matches for the expanded sub-string and obtaining a count of the matches for the expanded sub-string using an information retrieval system; and
if the count of items is in the hash table, then retrieving a count of items for the sub-group being processed from the hash table.

16. The process of claim 15, further comprising using the information retrieval system to determine an item in the sub-group being processed to be used to represent the sub-group being processed based on scoring criteria.

17. The process of claim 16, wherein the scoring criteria further comprises: (a) a general popularity of each item based on many users; (b) a specific popularity of each item based on a personal preference of a specific user; (c) a measure of popularity based on a number of hits each item receives; (d) a measure of popularity based on a number of times an item was opened; (e) how recently an item was used, such that an item used more recently than another item is more likely to be selected by the user; or (f) recommendations of other users or professionals in the field to which the items are associated.

18. A method for navigating a database of items to find a specific item in the database of items that is desired by a user, comprising:
using a portable media player having a limited input mechanism to perform the following:
inputting an empty sub-string;
obtaining a count of matches for the empty sub-string from a hash table;
selecting a sub-group for processing from the matches for the empty sub-string, where there is a sub-group for each available English language character, and for each of the sub-groups performing the following actions:
  determining whether a count of items for the sub-group being processed is in the hash table;
  if the count of items for the sub-group being processed is not in the hash table, then looking up matches for an expanded sub-string and obtaining a count of the matches for the expanded sub-string using an information retrieval system, where the expanded sub-string is defined as the empty sub-string plus an additional character associated with the sub-group being processed;
  if the count of items for the sub-group being processed is in the hash table, then retrieving the count of items for the sub-group being processed from the hash table;
  selecting an item in the sub-group being processed to represent the sub-group by using the information retrieval system and based on scoring criteria;
generating an augmented list view of items based on the empty sub-string, where each of the sub-groups are represented in the augmented list view by the item selected to represent the sub-group, and where the number of sub-groups represented in the augmented list view is less than or equal to a number of available characters;
determining that the specific item in the database of items that is desired by the user is not shown in the augmented list view;
pinning a character shown in the augmented list view using the limited input mechanism to obtain a pinned character;
revising the empty sub-string based on pinned character to generate a revised sub-string, such that the revised sub-string includes the pinned character;
repeating the above process actions by substituting the revised sub-string for the empty sub-string and determining whether a count of matches for the revised sub-string is greater than a list threshold;
finding the specific item in the database of items;
allowing the user to continue to revise the revised sub-string by pinning additional characters such that a pinning feature is active even after the specific item is found by appearing on the augmented list view, revising the revised sub-string further comprising:
  moving a cursor up or down over a desired character;
  moving the cursor to the right so as to pin the desired character to the revised sub-string and to generate a further revised sub-string that includes the pinned character; and
  alternating between moving the visual indicator up or down and then to the right in order to pin desired characters and obtain the desired item.

19. The method of claim 18, further comprising:
if the count of matches for the revised sub-string is greater than the list threshold, then generate an augmented list view of items based on the revised sub-string using the hash table and the information retrieval system;
if the count of matches for the revised sub-string is less than or equal to the list threshold, then generate a regular list view based on the revised sub-string using the information retrieval system;
augmenting the augmented list view or the regular list view by adding one or more of the following augmentations:
  (a) a quantity representation that represents a number of items in a particular sub-group in the augmented list view;
  (b) an item focus representation that differentiates and distinguishes an item in focus from other items on the augmented list view or the regular list view; or
  (c) a character focus representation that differentiates a character in focus from other surrounding characters in the augmented list view or the regular list view.

* * * * *